United States Patent
Saul

(10) Patent No.: US 7,467,338 B2
(45) Date of Patent: Dec. 16, 2008

(54) APPARATUS AND METHOD FOR GENERATING AN ERROR SIGNAL

(75) Inventor: Andreas Saul, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 101 days.

(21) Appl. No.: 11/520,478

(22) Filed: Sep. 12, 2006

(65) Prior Publication Data

US 2007/0089015 A1     Apr. 19, 2007

Related U.S. Application Data

(63) Continuation of application No. PCT/EP2004/007121, filed on Jun. 30, 2004.

(30) Foreign Application Priority Data

Mar. 12, 2004  (WO) ................ PCT/EP2004/002608

(51) Int. Cl.
  *G01R 31/28* (2006.01)
  *H04B 1/10* (2006.01)

(52) U.S. Cl. ...................... 714/712; 375/350

(58) Field of Classification Search ................. 714/712, 714/700, 701, 799; 375/350
   See application file for complete search history.

(56) References Cited

U.S. PATENT DOCUMENTS 6,128,350 A     10/2000   Shastri et al.

2005/0169411 A1*  8/2005  Kroeger .................. 375/350

OTHER PUBLICATIONS

International Preliminary Examination Report dated Jul. 27, 2006.
International Search Report dated Nov. 29, 2004.
Krongold, et al., "PAR Reduction in OFDM via Active Constellation Extension," IEEE Transactions on Broadcasting, XP-002303893, 49:258-268 (2003).
Armstrong, J., Peak-to-average Power Reduction for OFDM by Repeated Clipping and Frequency Domain Filtering, Electronics Letters, 2002.
Saul, A., Comparision Between Recursive Clipping and Active Constellation Extension for Peak Reduction in OFDM Systems.
Saul, A., Analysis of Peak Reduction in OFDM Systems Based on Recursive Clipping.
Krongold, B.S., et al, PAR Reduction in OFDM via Active Constellation Extension, IEEE Transactions on Broadcasting, 2003.
Krongold, B.S., et al, PAR Reduction in OFDM via Active Constellation Extension, IEEE 2003.

(Continued)

*Primary Examiner*—Phung M Chung
(74) *Attorney, Agent, or Firm*—Edwards Angell Palmer & Dodge LLP; John J. Penny, Jr.

(57) ABSTRACT

The invention relates to an apparatus for generating an error signal from an input signal, the error signal to be used for generating a transmit signal, the apparatus comprising: distorter for distorting the input signal to obtain a distorted signal, calculator for calculating a preliminary error signal representing a difference between the input signal and the distorted signal or representing the input signal, manipulator for manipulating the preliminary error signal to obtain the error signal, wherein the manipulator for manipulating is configured for varying a preliminary error signal value to obtain an error signal value which is non-equal to zero.

35 Claims, 25 Drawing Sheets

OTHER PUBLICATIONS

Jones, A.E., et al, Block Coding Scheme for Reduction of Peak to Mean Envelope Power Ratio of Multicarrier Transmission Schemes, Electronics Letters, 1994.

Ryu, H-G, et al, PAPR Reduction Using Soft Clipping and ACI Rejection in OFDM System, IEEE 2002.

Pauli, M., et al, On the Reduction of the Out-of-band Radiation of OFDM-Signals, IEEE 1998.

Lampe, M., et al, Reducing Out-of-band Emissions Due to Nonlinearities in OFDM Systems, IEEE 1999.

Katz, A., et al, Linearization: Reducing Distortion in Power Amplifiers, IEEE Microwave Magazine, 2001.

Zillmann, P., et al, A Novel Receive Algoritm for Clipped OFDM Signals.

Kim, D., et al, Clipping Noise Mitigation for OFDM by Decision-Aided Reconstruction, IEEE 1999.

Tellado, J., et al, Maximum-Likelihood Detection of Nonlinearly Distorted Multicarrier Symbols by Iterative Decoding, IEEE Transactions on Communications 2003.

Atarashi, H., A Computational Cost Reduction Scheme for a Post-Distortion Type Nonlinear Distortion Compensator of OFDM Signals, IEICE Trans. Commun. 1998.

Muller, S.H., et al, OFDM with Reduced Peak-to-average Power Ratio by Multiple Signal Representation, Annals of Telecommunications, 1997.

Krongold, B. S., et al, A New Tone Reservation Method for Complex-Baseband Par Reduction in OFDM Systems, IEEE, 2002.

Jones, D.L., Peak Power Reduction in OFDM and DMT via Active Channel Modification, IEEE 1999.

Krongold, B. S., et al, A Study of Active Constellation Extension for PAR Reduction in OFDM.

Robling, C., et al, A Construction of OFDM 16-QAM Sequences Having Low Peak Powers, IEEE Transactions on Information Theory, 2001.

Ermolova, N.Y., New Companding Transform for Reduction of Peak-to-average Power Ratio, IEEE 2002.

Boonsrimuang, P., et al, Proposal of Clipping and Inter-modulation Noise Mitigation Method for OFDM Signal in Non-linear Channel.

Kabulepa, L.D., et al, Design Space Exploration for Clipping and Filtering PAPR Reduction Techniques in OFDM Systems.

Tellado, J., et al, Peak Power Reduction for Multicarrier Transmission.

Wang, X., Reduction of Peak-to-average Power Ratio of OFDM System Using a Companding Technique, IEEE Transactions on Broadcasting 1999.

Lawrey, E., et al, Peak to Average Power Ratio Reduction of OFDM Signals Using Peak Reduction Carriers, Fifth International Symposium on Signal Processing and its Applcations, 1999.

Armstrong, J., New OFDM Peak-to-average Power Reduction Scheme, IEEE 2001.

Schmidt, H., et al, Reducing the Peak to Average Power Ratio of Multicarrier Signals by Adaptive Subcarrier Selection, IEEE 1998.

Muller, S.H., et al, A Comparision of Peak Power Reduction Schemes for OFDM, IEEE 1997.

* cited by examiner

| | |
|---|---|
| Transmission scheme | OFDM |
| Number of subcarriers | N = 1024 |
| Symbol mapping | QPSK, 16QAM |
| Channel coding | none |
| Channel model | AWGN |
| Oversampling rate (clipping) | 2 |
| Amplifier model | Rapp's SSPA ($p = 10$) |
| Output back-off | OBO = 6 dB |
| Guard interval | 11.1% |
| Roll-off factor | 11.1% |
| Mismatching | 0.4 dB |
| Target bit error rate | $10^{-3}$ |
| Normalized frequency | $f/f_a = 0.6$ |
| Clipping ratio | CR = 0 dB...12 dB |

FIG. 2h

II. Iteration step:
⋮
FFT of preliminary error signal in magnified scale
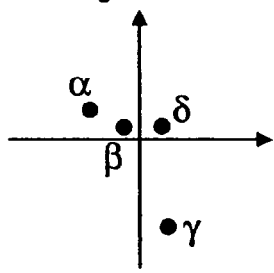
Constrained error signal
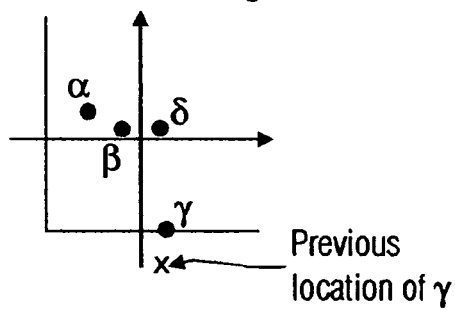
Previous location of γ
FFT of final error signal
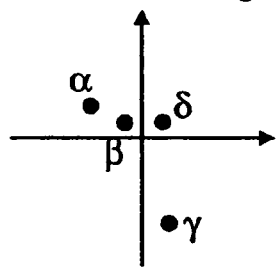
Fft of peak reduced signal
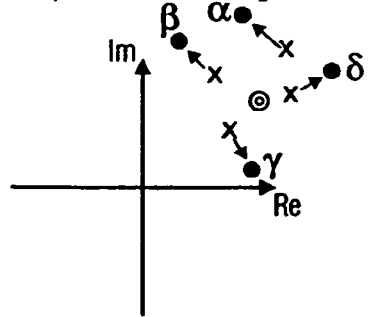
FIG. 21
Non-reverse extension:
Im α, Re β, Im β, Im γ, Re δ, Im δ
Reverse extension:
Re α, Re γ

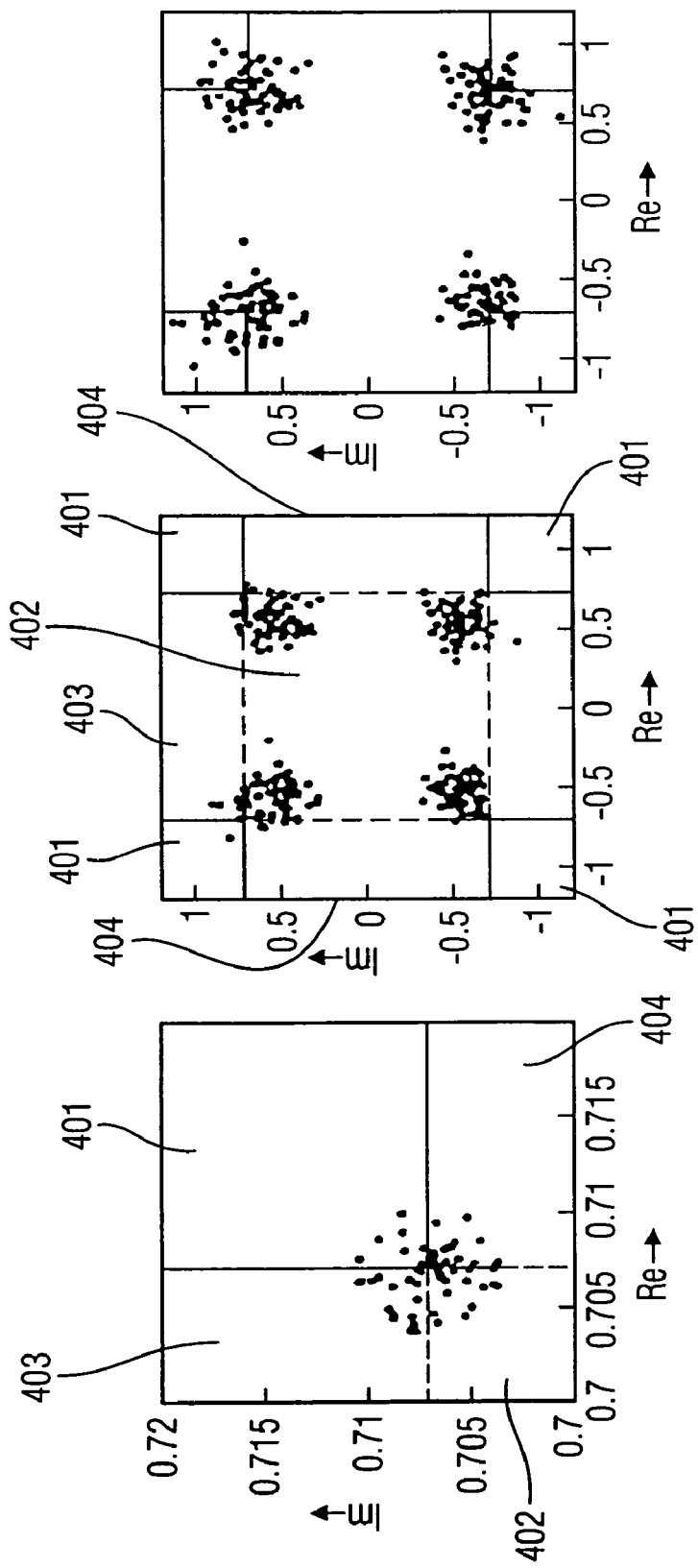

APPARATUS AND METHOD FOR GENERATING AN ERROR SIGNAL

CROSS-REFERENCE TO RELATED APPLICATION

This application is a continuation of copending International Application No. PCT/EP2004/002608, filed Mar. 12, 2004, which designated the United States and was not published in English, and is incorporated herein by reference in its entirety.

BACKGROUND OF THE INVENTION

1. Field of the Invention

The present invention is in the field of telecommunications and, in particular, in the field of multi-carrier transmission techniques.

2. Description of Related Art

Multi-carrier transmission is a promising modulation scheme for e.g. $4^{th}$ generation mobile communication systems (4G) because it allows to transmit over a broad bandwidth and to achieve high-speed and large capacity throughput performance. One of the problems associated with multi-carrier modulation schemes is an increased peak-to-average power ratio (PAPR) resulting from a super-position of a plurality of frequency signal components in a time domain signal to be transmitted. The problem associated with high signal peaks in a multi-carrier modulation technique results from the fact that a high PAPR causes clipping or bad resolution in digital-to-analogue converters and non-linear distortion in high power amplifiers (HPA), which causes serious out-of-band emissions disturbing adjacent signals. Generally, high PAPR makes a signal detection at a receiver difficult and, therefore, leads to an increased bit error rate.

Among other multi-carrier transmission techniques, the orthogonal frequency division multiplexing (OFDM) is frequently used. At a transmitter, an OFDM signal is obtained from assigning a number of spectral values to be transmitted to subcarriers used for transmission, wherein a transmit signal is obtained from an inverse Fourier transform applied to the spectral values. The spectral values are obtained from dividing information values into groups containing a number of information values and mapping the groups of information values onto signal space constellation points in a signal space domain. Therefore, a group of information values is represented by a signal space constellation point having a real part and an imaginary part. The mapping operation is equivalent to modulating the groups of information bits using a modulation technique, for example, a quadrature amplitude modulation (QAM), assigning a group of information values to a signal space constellation point from a set of signal space constellation points associated with the modulation technique.

In the case of OFDM, high signal peaks origin from superposing the subcarriers. The high power amplifier heavily distorts all signal parts that come close to, or exceed saturation. The distortion causes inter-carrier interference (ICI) and the above-mentioned OOB radiation. While ICI disturbs the transmitted signal and degrades the bit error rate (BER), OOB radiation disturbs signals on adjacent frequency bands and should also be avoided.

Known peak reduction techniques are used in order to mitigate the negative effects of nonlinear distortion. Non-distortion techniques like selective mapping (SLM), partial transmit sequences (PTS) and derivatives can achieve a good peak reduction by transmitting only symbols with low peaks. The SLM approach is disclosed in S. H. Müller, R. W. Bäuml, R. F. H. Fischer and J. B. Huber, "OFDM with Reduced Peak-to-Average Power Ratio by Multiple Signal Representation," Annals of Telecommunications, Vol. 52, No. 1-2, pp. 1-9, February, 1997, the PTS approach is disclosed in S. H. Müller and J. B. Huber, "A Comparison of Peak Power Reduction schemes for OFDM," in Proc. Of Globecom. November 1997, pp. 1-5.

A transmission of side information is one problem associated with non-distortion techniques, so that a data structure has to be changed. Known non-distortion techniques require extensive effort at the transmitter in order to find the symbol with the lowest peaks and require additional efforts at every receiver in order to restore the signal.

In order to reduce PAPR, coding techniques, as disclosed in A. E. Jones, T. A. Wilkinson and S. K. Barton, "Block Coding Scheme for Reduction of Peak to Mean Envelope Power Ratio of Multicarrier Transmission Schemes," El. Lett, Vol. 30, No. 25, pp. 2098-2099, December 1994 can be used. Coding techniques use codes, whose codewords have low PAPR. This, however, generally limits the flexibility in transmitter design. Furthermore, if channel codes are designed for low PAPR, same cannot be used anymore in order to optimise system performance by fitting the code for the channel and the transmission scheme. Moreover, for a high number of subcarriers in a case of a multi-carrier transmission technique like OFDM, the code rate of the currently known peak reduction codes must be low in order to achieve a significant PAPR reduction.

Using peak reduction carriers/tones (PRC/PRT) disclosed in E. Lawrey and C. J. Kikkert, "Peak to Average Power Ration Reduction of OFDM Signals Using Peak Reduction Carriers," in Int. Symposium on signal Processing and its applications, August 1999, pp. 737-740, J. Tellado and J. M. Cioffi, "Peak Power Reduction for Multicarrier Transmission," in Mini-Globecom, 1999, optionally in combination with adaptive subcarrier selection (ASuS) disclosed in H. Schmidt and K.-D. Kammeyer, "Reducing the Peak to Average Power Ratio of Multicarrier Signals by Adaptive Subcarrier Selection," in Int. Conference on Universal Personal Communications, January 1998, pp. 933-937, offers some degrees of freedom to reduce PAPR without introducing ICI on the data carriers. However, for a strong reduction of PAPR, many peak reduction carriers are needed corresponding to a significant loss in data rate. ASuS is using only the weakest subcarriers for peak reduction and therefore requires feedback information from the receiver about the channel state information (CSI). However, the more receivers have to be reached, the less probable it becomes to find subcarriers that are weak for all receivers.

Clipping techniques offer a high flexibility, as many of them are basically applicable for any modulation scheme. Whereas clipping and filtering in time domain, as is disclosed in L. D. Kabulepa, T. Pionteck, A. Garcis and M. Glesner, "Design Space Exploration for Clipping and Filtering PAPR Reduction Techniques in OFDM Systems," in Proc. Int. OFDM-Workshop, Vol. 1, October 2003, pp. 108-112, offers a peak reduction at low implementation costs, repeated clipping and frequency filtering disclosed in J. Armstrong, "Peak-to-Average power reduction for OFDM by repeated clipping and frequency domain filtering," in El. Lett. Vol. 38, No. 5, February 2003, pp. 246-247 allows to remove that part of the out-of-band radiation completely that is introduced by clipping. However, most clipping techniques introduce ICI. This undesirable effect becomes significant when the clipping ratio is chosen low in order to achieve a low out-of-band radiation.

The filtering operation and the peak regrowth that is incorporated with the filtering can be avoided when soft clipping, as disclosed in H.-G. Ryu, B.-I Jin and I.-B. Kim, "PAPR Reduction Using Soft Clipping and ACI Rejection in OFDM Systems," IEEE Trans. On Communications, Vol. 48, No. 1, pp. 17-22, February 2002, peak windowing as disclosed in M. Pauli and H.-P. Kuchenbecker, "On the Reduction of the Out-of-Band Radiation of OFDM-Signals," in Int. Conference on Communications, Vol. 3, 1998, pp. 1304-1308 or peak cancellation techniques as disclosed in M. Lampe and H. Rohling, "Reducing out-of-band emissions due to nonlinearities in OFDM systems," in Vehicular Technology Conference, Vol. 3, May 1999, pp. 2255-2259 are used. However, this is done at the expense of additional ICI.

Improving the ICI can be done at the transmitter by pre-distorting the signal as is disclosed in A. Katz, "Linearization: Reducing Distortion in Power Amplifiers," IEEE Microwave Magazine, Vol. 2, No. 4, pp. 37-49, December 2001. This compensates for the amplifier's nonlinearity. However, signal peaks exceeding the amplifier's saturation are still distorted, so that supplementary peak reduction techniques have to be used. Complementarily, it is possible to model the distorted transmitted signal and to consider the limited dynamic range by a Bayesian estimator at the receiver as is disclosed in P. Zillmann, H. Nuszkowski and G. P. Fettweis, "A Novel Receive Algorithm for Clipped OFDM Signals," in Proc. Int. Symp. On Wireless Personal Multimedia Communications, Vol. 3, October 2003, pp. 385-389.

As one further possibility companding techniques as disclosed in X, Wang, T. T. Tjhung and C. S. Ng, "Reduction of Peak-to-Average Power Ratio of OFDM System Using a Companding Technique," IEEE Trans. On Broadcasting, Vol. 45, No. 3, pp. 303-307, September 1999 can be used. They are composed of a transmit processing part that compresses the signal at the transmitter and a receive processing part that expands the signal to the original dynamic range with low complexity. Alternative techniques that have a deeper impact in the receiver's design are decision-aided reconstruction (DAR) as disclosed in D. Kim and G. L. Stuber, "Clipping Noise Mitigation for OFDM by Decision-Aided Reconstruction," IEEE Communications Letters, Vol. 3, No. 1, pp. 4-6, January 1999 or iterative maximum likelihood detection as disclosed in J. Tellado, L. M. C. Hoo and J. M. Cioffi, "Maximum-Likelihood Detection of Nonlinearly Distorted Multicarrier Symbols by Iterative Decoding," IEEE Trans. On Communications, Vol. 51, No. 2, pp. 218-228, February 2003. They require, however, significantly more computational complexity at the receiver.

The active constellation extension (ACE) technique disclosed in B. S. Krongold and D. L. Jones, "PAR reduction in OFDM via Active Constellation Extension," IEEE Trans. On Broadcasting, vol. 49, No. 3, pp. 258-268, September 2003 considers the ICI without any modifications at the receiver. The outer constellation points in the signal space (signal space domain) are extended to minimize the PAPR. After clipping the signal peaks, undesired extension directions in the signal space are set to zero so that the decision boarders are never approached. However, it is not possible to achieve very low OOB radiation and it is effective mainly for small constellation sizes, e.g. for quaternary phase shift keying (QPSK).

The tone injection technique disclosed in J. Tellado and J. M. Cioffi, "Peak Power Reduction for Multicarrier Transmission," in Mini-Globecom, 1999, which belongs to a class of non-distortion techniques, is an alternative to ACE that also extends the signal constellation, but it is more suitable for higher-order constellations. The tone injection results in a higher order signal constellation, e.g. a 16 QAM amplitude modulation symbol may be transformed to a 144 QAM symbol. This avoids ICI, but the average symbol energy increases and so does the required signal-to-noise ratio (SNR).

In the following, OFDM modulation for transmitting on multiple subcarriers, serving as an example of a multi-carrier modulation scheme, will be considered by the way of example only. $d_n(i)$ are the complex data symbols transmitted at time instant i on subcarrier n. The transmitted signal after OFDM modulation $$s(t) = \sum_{i=-\infty}^{\infty} \sum_{n=0}^{N-1} d_n(i) g_n(t - iT)$$

is composed of the N subcarriers $d_n(i)$, where $$g_n(t) = g(t) e^{jw_n t}$$

are the transmit filters. For example, raised cosine impulse shapes can be selected for g(t).

For example, the HPA may be represented by Rapp's solid state power amplifier (SSPA) model disclosed in H. Atarashi and M. Nakagawa, "A Computational Cost Reduction scheme for a Post-Distortion Type Nonlinear Distortion Compensator of OFDM Signals," IEICE Trans. On communications, vol. E81-B, No. 12, pp. 2334-2342, December 1998 with amplification characteristic $$\bar{s}(t) = \frac{Vs(t)}{(1 + |Vs(t)/A_{SAT}|^{2p})^{1/2p}}$$

where p=10, $\bar{s}(t)$ is the amplified signal, V can be considered as being an amplification factor, and $$P_{SAT} = A_{SAT}^2$$

is the amplifiers saturation power.

In order to reduce the nonlinear distortion of peaks, the amplifier is driven with an output back-off (OBO). The OBO is defined as the ratio between the amplifier's saturation power and the power of the amplifier's output signal $$OBO|_{dB} \triangleq 10 \log_{10} \frac{P_{SAT}}{E\{|\bar{s}(t)|^2\}}$$

Without any further measures, the OFDM signal may exceed the amplifiers saturation from time to time. In order to reduce the dynamic range of the OFDM signal s(t) clipping techniques can be used to cut peak amplitudes.

FIG. 12 shows a block diagram of an OFDM transmitter incorporating the clipping approach in order to reduce PAPR.

The transmitter in FIG. 12 demonstrates non-recursive clipping (solid lines), as disclosed in J. Armstrong, "New OFDM Peak-to-Average Power Reduction Scheme," in Vehicular Technology Conference, Vol. 1, Spring 2001, pp. 756-760. Moreover, the transmitter shows the recursive clipping approach depicted with dashed lines.

The transmitter shown in FIG. 12 comprises a data symbol source 1500 having an output coupled to an input of a zero padding block 1501. The zero padding block 1501 is coupled to an inverse fast Fourier transformer (IFFT) 1503. An output of the IFFT is coupled to a clipping block 1505 having an output coupled to a fast Fourier transformer (FFT) 1507. An output of the FFT 1507 is coupled to a filter 1509, the filter 1509 having an output coupled to an OFDM modulator 1511.

Using a recursive clipping technique, a filtered signal provided by the filter 1509 is fed back to the zero padding block 1501.

The data symbols on subcarriers $$d^0 \triangleq (d_0, \ldots, d_{N-1})^T$$

are first transferred into a time domain signal using the IFFT block 1503. The zero padding before the FFT leads to an oversampling in time domain. Next, the signal is clipped at a clipping level $x_{max}$. A clipping ratio CR is defined by $$CR|_{dB} \triangleq 10\log_{10} \frac{x_{max}^2}{E\{d^{0H}d^0\}}$$

The clipped signal is transformed back into the frequency domain. While the first N elements of the FFT output are the new data symbols that correspond to the amplitude limited time signal, the other part of the output vector contains only intermodulation products that would appear as OOB radiation on the channel. These elements are suppressed by the filtering block 1509 of the system.

The disadvantage of clipping is the error between the original data symbols and the new data vector. This difference is the ICI which has previously been mentioned.

Contrary to the clipping and symbol-by-symbol filtering approach described above, a repeated clipping and frequency domain filtering associated with the recursive clipping is depicted with the dashed lines in FIG. 12. While the clipped signals amplitude is peak reduced, the filtering removes all high frequencies and the peaks regrow. For this reason, it may be of advantage to repeat clipping and filtering. Therefore, the filtered signal is fed back, as is shown in the dashed part of FIG. 12. Although any number of iterations is possible, it has been shown in A. Saul, "Analysis of Peak Reduction in OFDM Systems Based on Recursive Clipping," in Proc. Int. OFDM-Workshop, Vol. 1, September 2003, pp. 103-107 that depending on the system parameters, at most one repetition of clipping and filtering may be of advantage in many cases.

An alternative technique to that described above is the ACE technique previously mentioned. The basic concept behind the ACE technique can be summarised as extending the constellation points in the symbol space (signal space domain) while applying a set of constraints. The constraints prevent symbols to approach the decision boarders in the complex signal space.

FIG. 13 shows a block diagram of a transmitter using the ACE technique.

The ACE transmitter comprises the data symbol source 1500 coupled to an IFFT 1600 having an output 1601. The IFFT 1600 performs an inverse Fourier transform and oversampling and has the same function as the blocks zero-padding 1501 and IFFT 1503 in FIG. 12. The output 1601 is coupled via a switch 1603 to a subtractor 1605, to a clipping block 1607, to an ACE constraint block 1609, to an SGP block 1611 (SGP=smart gradient project) and to the adder 1613.

An output of the subtractor 1605 is coupled to an FFT 1615 having an output coupled to the ACE constraint block 1609. The FFT 1615 performs a Fourier transform and filtering, which is comparable to the operation of the blocks 1507 and 1509 in FIG. 12. The ACE constraint block 1609 has an output coupled to an IFFT 1617 having an output coupled to a multiplier 1619. The IFFT 1617 performs an inverse Fourier transform and oversampling. The multiplier 1619 has a further input to which an output of the SGP 1611 is coupled. The SGP 1611 has a further input to which the output of the IFFT is coupled. An output of the multiplier 1619 is coupled to an input of the adder 1613. An output of the adder 1613 is coupled via a switch 1621 to an impulse-shaping block 1623.

The ACE transmitter shown in FIG. 13 further comprises a feedback loop 1625 connecting the output of the adder 1613 with the input of the subtractor 1615, when the switches 1603 and 1621 are appropriately switched.

Similar to the other clipping techniques described above, the oversampled time signal provided by the IFFT 1600 is clipped by the clipping block 1607. In order to allow only certain extension directions, the clipped signal portion is transformed into the frequency domain using the FFT 1615, where unwanted extension directions are set to zero in the ACE constraint block 1609. After transforming back into time domain, the μ-fault of the extension vector provided by the IFFT 1617 is added to the original unclipped signal.

The weighting factor μ is determined by the above-mentioned smart gradient project algorithm in a sub-optimum, but computational efficient way, so that a peak reduction can be achieved. In order to reduce peaks further, the procedure can be repeated several times. In practice, one or two repetitions seem to be reasonable.

FIG. 14a shows a signal space constellation after recursive clipping at CR=3.1 dB. Recursive clipping superposes an approximately white Gaussian-noise like signal to the sub-carriers and ACE shapes the interference so that no signal points are close to the decision boarders. FIG. 14b illustrates the signal space constellation after ACE for a QPSK signal with CR=5.0 dB. As is depicted in FIG. 14b, non-acceptable extension directions will be set to zero. The extension direction is non-acceptable, if the signal point would approach the decision boarders. In reference to FIG. 4a, sub-carriers in the top corner fully contribute to peak reduction. Sub-carriers in the top left corner only contribute with imaginary part, since the real part of the extension vector will be set to zero. Sub-carriers in the bottom right corner only contribute with real part, since the imaginary part of the extension vector will be set to zero.

If, for example, a clipping level is too low, then only a few of signal points remain within the right-angled area, so that only few signal points contribute to PAPR reduction. However, the fewer signal points remain within the allowed area, the more insufficient PAPR reduction can be achieved. Although an increased clipping level would introduce more signal points within the allowable area, the OOB radiation would increase in this case, so that other transmitters on adjacent frequency bands are disturbed.

SUMMARY OF THE INVENTION

It is the object of the present invention to provide a concept for generating an error signal having an increased number of error signal components contributing to a reduction of amplitude peaks in a transmit signal.

In accordance with a first aspect, the present invention provides an apparatus for generating an error signal from an input signal, the error signal to be used for generating a transmit signal, the apparatus having a distorter for distorting the input signal to obtain a distorted signal; a calculator for calculating a preliminary error signal representing a difference between the input signal and the distorted signal or representing the input signal, wherein the preliminary error signal comprises a number of preliminary error signal values; a manipulator for manipulating the preliminary error signal to obtain the error signal, wherein the manipulator for manipulating is configured for varying a preliminary error signal value to obtain an error signal value which is non-equal to zero, wherein the manipulator for manipulating is further configured, for the case the preliminary error signal value does not meet a property requirement, for back manipulating the preliminary error signal value to some extent to obtain an error signal value being associated with a signal space constellation point being within a further predetermined area in the signal space domain, the further predetermined area being outside the predetermined area.

In accordance with a second aspect, the present invention provides an apparatus for generating a transmit signal from an input signal, wherein the input signal comprises an amplitude peak resulting from a superposition of a plurality of frequency signals due to a multi-carrier modulation scheme, the apparatus having the above mentioned apparatus; a processor for processing the error signal to obtain a processed error signal; and a combiner for combining the processed error signal with the input signal to obtain the transmit signal having a reduced amplitude peak.

In accordance with a third aspect, the present invention provides a method for generating an error signal from an input signal, the error signal to be used for generating a transmit signal, the method having the steps of distorting the input signal to obtain a distorted signal; calculating a preliminary error signal representing a difference between the input signal and the distorted signal or representing the input signal; varying a preliminary error signal value to obtain an error signal value which is non-equal to zero, wherein the step of varying is performed such that, for the case that the preliminary error signal value does not meet a property requirement, the preliminary error signal value is back manipulated to some extend to obtain an error signal value being associated with the signal space constellation point being within a further predetermined area in the signal space domain, the further predetermined area being outside the predetermined area.

In accordance with a fourth aspect, the present invention provides a method for generating a transmit signal from an input signal, wherein the input signal comprises an amplitude peak resulting from a superposition of a plurality of frequency signals to a multi-carrier modulation scheme, the method having the steps of generating an error signal from the input signal in accordance with the above mentioned method; processing the error signal to obtain a processed error signal; and combining the processed error signal with the input signal to obtain the transmit signal having a reduced amplitude peak.

In accordance with a fifth aspect, the present invention provides a computer program having a program code for performing one of the above mentioned methods, when the computer program runs on a computer.

The present invention is based on the finding that a number of error signal components contributing to PAPR reduction can be increased when error signal values in frequency domain are varied.

In accordance with the present invention, the error signal is generated in two processing stages. Firstly, a preliminary error signal representing a difference between the input signal and a distorted signal or representing the input signal, the preliminary error signal being provided by a means for distorting is calculated. The preliminary error signal may comprise preliminary error signal values in a frequency domain which are, in a second processing step, varied in frequency domain in order to obtain the error signal. Alternatively, the preliminary error signal may comprise preliminary error signal values in a time domain. Secondly, a preliminary error signal value is varied in such a way that a resulting error signal value is non-equal to zero. In this context, the error signal value may represent a complex number having a real and an imaginary part. However, the preliminary error signal value may represent only a real part or only an imaginary part of a complex number. Moreover, the error signal value may represent a real number. Additionally, a vector comprising the preliminary error signal values may be varied.

For example, a preliminary error signal value is a frequency domain value. In this case, the preliminary error signal value in frequency domain is associated with a signal space constellation point having, for example, a real part and an imaginary part in a signal space domain, a variation of the preliminary error signal value is equivalent to moving the signal space constellation point in the signal space domain towards, for example, a predetermined area associated with a predetermined value range in the signal space domain.

In accordance with the present invention, the predetermined value range or, in other words, the predetermined area in the signal space domain can be chosen such that a number of error signal values being moved towards the predetermined area is increased so that an increased number of error signal values associated with signal space constellation points within the predetermined area or on a boundary thereof contribute to the amplitude peak reduction. Simultaneously, the predetermined area can be chosen upon consideration of a signal detection performance at a receiver.

In other words, the preliminary error signal values are shaped in frequency domain such that, simultaneously, amplitude peak reduction is optimized an a bit error ratio resulting from an erroneous detection at a receiver is minimized.

In this context, the predetermined value range may determine a predetermined set of real values. Additionally, the predetermined value range may determine a predetermined set of complex values, i.e. the predetermined value range may be real or complex. Moreover, the predetermined value range may comprise separated predetermined sub-ranges. In other words, the predetermined value range may be continues or may discontinues. Same considerations apply to the characteristics of the predetermined area.

Generally, the preliminary error values are manipulated such that the resulting error values may have an advantageous distribution. In this context, the predetermined value range or area determine a special case of the advantageous distribution.

The present invention further provides a concept for generalizing the constraints of the ACE technique. The generalized constraints allow the possibility of reverse extension (associated with back-manipulating) in iterative or recursive peak reduction algorithms. Furthermore, the error, which is related to the constraints, is smaller than for the conventional ACE technique. Moreover, additional degrees of freedom can be utilized for peak reduction. The inventive technique is applicable e.g. for both, QPSK and higher order QAM modulation. A parameter allows the adaptation of the technique to e.g. a required out-of-band radiation. In this connection it is to be noted that instead of moving the points to fixed borders, which are the generalized ACE constraints, it is also preferred to move the points just by some extend.

BRIEF DESCRIPTION OF THE DRAWINGS

In the following, preferred embodiments of the present invention are explained in more detail with reference to the accompanying drawings, in which:

FIG. 2h shows an embodiment of system parameters;

FIGS. 2k and 2l demonstrate the inventive concept;

FIGS. 4a to 4c show distributions of signal space constellation points;

DESCRIPTION OF THE PREFERRED EMBODIMENTS

Figure 1:
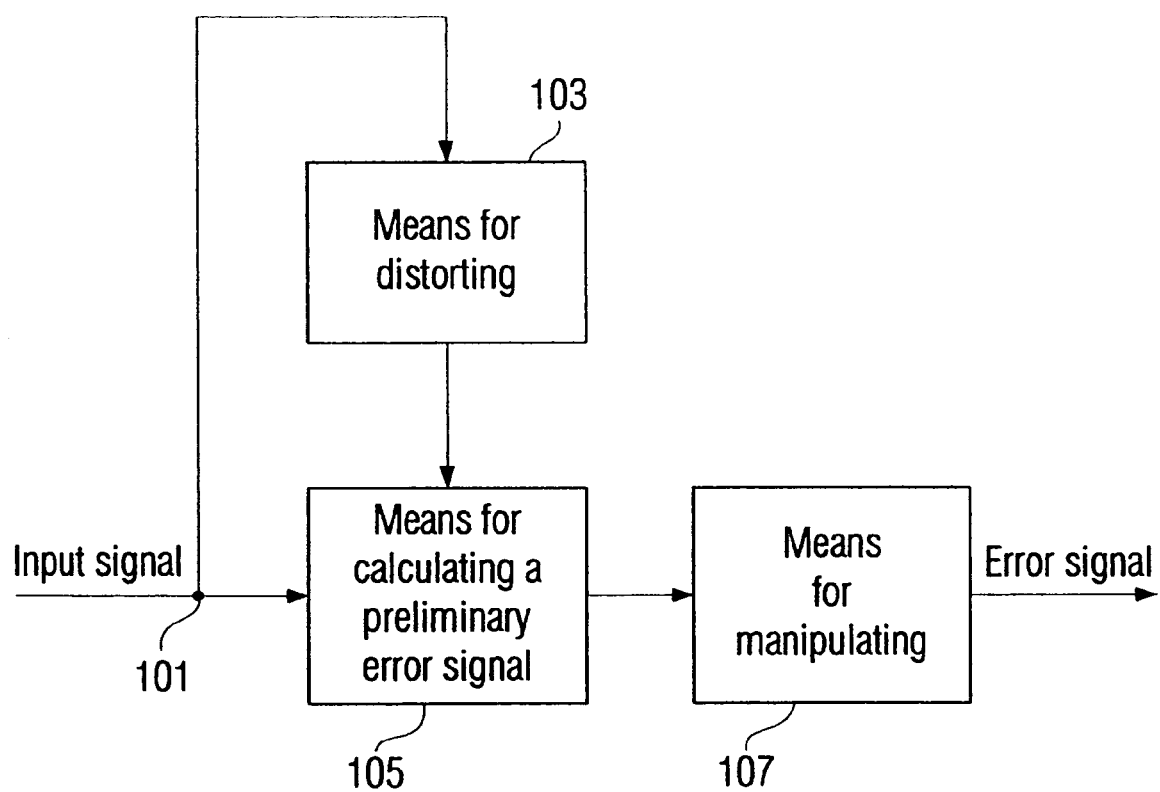
FIG. 1 shows a block diagram of an apparatus for generating an error signal in accordance with a first embodiment of the present invention.

The apparatus shown in FIG. 1 comprises an input 101 for receiving an input signal. Furthermore, the apparatus comprises means 103 for distorting having an input and an output, wherein the input 101 of the apparatus is coupled to the input of the means 103 for distorting, and wherein the output of the means 103 for distorting is coupled to an input of a means 105 for calculating a preliminary error signal. The means 105 for calculating has a further input, to which the input 101 of the apparatus is coupled. The means 105 for calculating has an output coupled to an input of a means 107 for manipulating, the means 107 for manipulating having an output for providing an error signal.

The means 103 for distorting is configured for receiving the input signal or a copy thereof in order to limit an amplitude of the input signal to obtain a distorted signal, which is provided to the means 105 for calculating the preliminary error signal which represents a difference between the input signal and the distorted signal. The means 105 for calculating provides the preliminary error signal to the means 107 for manipulating, wherein the preliminary error signal is a frequency domain signal comprising a number of preliminary error signal values in frequency domain associated with, for example, sub-carriers used by a multi-carrier modulation scheme. Therefore, each preliminary error signal value may comprise a real part and an imaginary part forming together a signal space constellation point in the frequency domain. The means 107 for manipulating is configured for varying a preliminary error signal value to obtain an error signal value comprised by the error signal, wherein the error signal value resulting from a manipulation of the preliminary error signal value is not equal to zero. In other words, the preliminary error signal value is used for generating an error signal value contributing for example to peak reduction and is not discarded or set to zero.

For example, the means 107 for manipulating is configured for varying the preliminary error signal value such that the error signal value is in a predetermined value range. The means for manipulating may be configured for varying the real part and/or the imaginary part of the preliminary error signal value within the predetermined value range indicating a real part value range and/or imaginary part value range. Accordingly, the means 107 for manipulating may be configured for varying the magnitude of the preliminary error signal value within the predetermined value range indicating a predetermined magnitude range.

As has been mentioned above, the error signal provided by the inventive apparatus shown in FIG. 1 may be combined with the input signal comprising an amplitude peak in order to generate the transmit signal having a reduced amplitude peak. Preferably, the means 107 for manipulating is configured for varying the preliminary error signal value such that the error signal value is in the predetermined value range in order to increase a number of error signal values in the predetermined value range contributing to amplitude peak reduction, and such that an out-of-band radiation is reduced.

In accordance with the present invention, a transmit signal is generated such that the out-of-band radiation is reduced or minimized after being further processed by the transmitter (e.g. being distorted by an amplifier). Therefore, a received version can be detected in a receiver with only few errors. Usually, such a signal will have reduced amplitude peaks.

In accordance with a further aspect of the present invention, the predetermined value range may be chosen such that the error signal value within the predetermined value range contributes to an amplitude peak reduction in the transmit signal and such that an error rate, for example a bit error rate or a symbol error rate, associated with an erroneous detection of a receivable version of the transmit signal due to combining the input signal with the error signal is minimized. In other words, the predetermined value range may be chosen subject to increasing a number of useful signal components for peak reduction and, simultaneously, subject to minimizing or reducing the error rate.

As has been mentioned above, the predetermined value range is associated with a predetermined area in a signal space domain, since both description ways are equivalent. Starting from this interpretation, the means 107 for manipulating is configured for varying a magnitude or a phase of the preliminary error signal value such that the resulting error signal value has a magnitude and a phase defining a signal space constellation point in the signal space domain, wherein the signal space constellation point is arranged inside the predetermined area or on a boundary thereof.

In accordance with a further aspect of the present invention, the means for manipulating is configured for forward-manipulating a preliminary error signal value in order to obtain an intermediate signal value being associated with a signal space constellation point within a predetermined area in a signal space domain, the means for manipulating being further configured, for the case the preliminary error signal value does not meet a property requirement, for back-manipulating the preliminary error signal value to some extent in order to obtain the error signal value being associated with the signal space constellation point being within a further predetermined area in the signal space domain, the further predetermined area being outside the predetermined area.

For example, the means 107 for manipulating is configured for forward-manipulating the preliminary error signal value, i.e. for manipulating the preliminary error signal value towards the predetermined area, in order to obtain an intermediate value being associated with a signal space constellation point within a predetermined area in a signal space domain, and, for the case, the preliminary error signal value does not meet a property requirement, for back-manipulating the preliminary error signal value to some extend in order to obtain an error signal value being associated with a signal space constellation point being within a further predetermined area in the signal space domain, the further predetermined area being outside the predetermined area.

In addition, the means 107 for manipulating may be configured for providing the preliminary error signal value as an error signal value for the case that the preliminary error signal value meets the property requirement.

The property requirement may be, for example, a channel state information, a signal quality measure, a combination of different signal quality measures, a certain bit error ratio or a certain power spectral density or a certain transmit power associated with transmitting the transmit signal, or a certain bit to noise energy ratio or a certain signal to noise energy ratio, both associated with a power spectral density, or a certain power spectral density associated with a bit to noise energy ratio or signal to noise energy ratio. The property requirements may further depend on transmission parameters (system parameters), e.g. a modulation scheme, associated with transmitting the transmit signal, or a maximum allowable out-of-band radiation for a considerer transmission system.

Additionally, it is to be noted that the property requirement can be chosen only once, i.e. initially at the beginning of a transmission. Alternatively, the property requirement can also be set adaptively, i.e. changed from one OFDM symbol to another OFDM symbol during a transmission.

Furthermore, the means 107 for manipulating may be configured for providing the preliminary error signal value as an error signal value for the case the preliminary error signal value meets the property requirement.

In accordance with a further aspect of the present invention, the apparatus may further comprise an analyzer for analyzing the preliminary error signal value with respect to the property requirement. For example, the analyzer is configured for emulating an impact of the preliminary error signal or of the preliminary error signal value on the transmit signal, which may be a time-domain signal, when generating a transmit signal by combining the input signal with the currently generated preliminary error signal.

In accordance with a further aspect of the present invention, the analyzer may comprise a plurality of tables stored in a memory, each table comprising a plurality of entries, the plurality of entries defining certain characteristics of possible error signal values required for achieving different property requirements. The characteristics of the preliminary error signal values may be, for example, a range of the real and the imaginary part required for achieving the property requirement.

In accordance with a further aspect of the present invention, the apparatus may be configured for generating the error signal iteratively, which scenario will be addressed later. In this case, the analyzer is preferably configured for analyzing an error signal value generated in a previous iteration step with respect to the property requirement, and, to some extent, for back-manipulating the error signal value to obtain an error signal value meeting the property requirement. In other words, the inventive apparatus is configured for performing a reverse extension by the means of back manipulating.

In accordance with a further aspect of the present invention, the apparatus may further comprise means for determining the predetermined area or/and the further predetermined area depending on the property requirement. In other words, the means for determining may be configured for determining or providing the predetermined area or the further predetermined area such that, for example, a back-manipulation to some extent is possible, i.e. that the predetermined area encloses an area which is unequal to zero.

In accordance with a further aspect of the present invention, the means for determining may be further configured for providing or determining the predetermined area or/and the further predetermined area in dependence on the signal space constellation point associated with e.g. a mapping or modulation scheme used as system parameters for transmission.

Figure 2A:
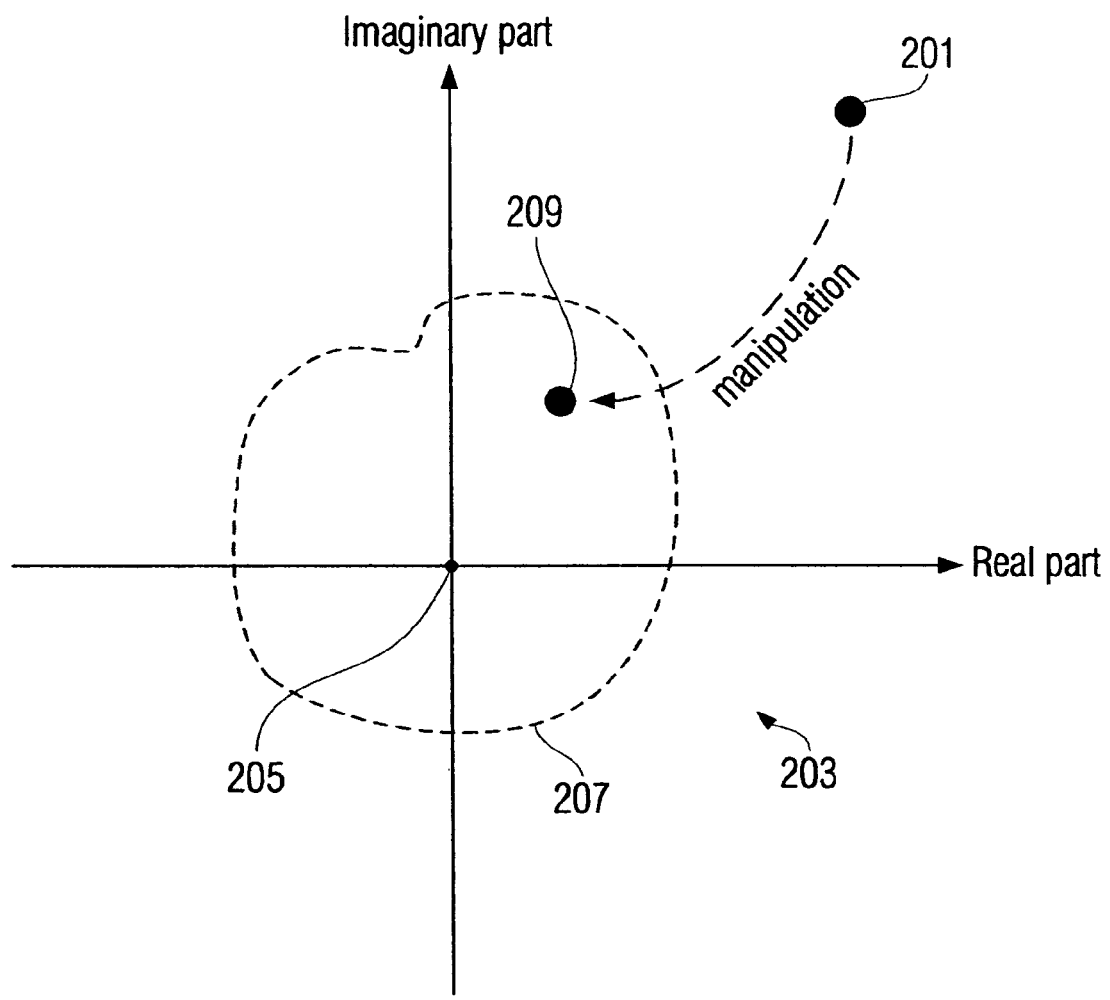
FIG. 2a demonstrates the inventive concept.

In order to explain the inventive concept in more detail, reference is made to FIG. 2a showing a signal space constellation point 201 representing the preliminary error signal value in a signal space domain 203. As it is depicted in FIG. 2a, the signal space domain is determined by a two-dimensional plane being determined by a real part axis and an imaginary part axis being orthogonal to the real part axis. Furthermore, the signal space domain 203 has an origin 205.

As it is depicted in FIG. 2a, the signal space constellation point 201 associated with the preliminary error signal value is outside a predetermined area 207. It is assumed, that only signal space constellation points within the predetermined area 207 or on a boundary thereof contribute to amplitude peak reduction without increasing a bit error rate at the receiver. In order to increase a number of error signal values within the predetermined area, the signal space constellation point 201 associated with the preliminary error signal value outside the predetermined area 207 is manipulated such that an error signal value 209 located within the predetermined area 207 results. In FIG. 2a, by the way of example only, one of the possible manipulation directions is depicted, towards which the signal space constellation point 201 associated with the preliminary error signal value is moved in order to obtain the signal space constellation point 201 associated with the error signal value within the predetermined area 207.

For example, the origin 205 in the signal space domain 203 is associated with signal space constellation points being equal to zero. In accordance with a further embodiment of the present invention, the origin point 205 may be excluded from the predetermined area 207 in order to avoid setting the signal space constellation point 201 outside the predetermined area 207 to zero.

The predetermined area 207 may have any shape in the signal space domain 203. For example, the predetermined area is rectangular or circular or is a segment of a circle; Moreover, the predetermined area may be arranged in any portion of the signal space domain, so that the origin point 205 must not necessarily be surrounded or included by predetermined area 207.

For example, the predetermined area 207 is circular with respect to the origin of the signal space domain 203. This case corresponds to a circular distribution of signal space constellation points associated with error signal values contributing to peak to average power reduction. This arrangement of the predetermined area correspond to a magnitude limitation of signal space constellation points in frequency domain. In this case, the means 107 for manipulating may comprise a magnitude limiter for limiting the magnitude of the preliminary error signal value to obtain the error signal value having a magnitude which does not exceed a radius of the predetermined area, wherein the radius is determined by a distance between a boundary of the predetermined area and the origin of the signal space domain in this case.

The predetermined area, or equivalently, the predetermined value range may be fixed so that, for example, the previously mentioned magnitude limiter is configured for limiting a number of preliminary error signal values with respect to a limiting ratio defined by, for example, the previously mentioned radius of the predetermined area in the signal space domain.

In accordance with a further aspect of the present invention, the apparatus may further comprise means for determining the predetermined area in the signal space domain. For example, the means for determining the predetermined area is configured for determining the predetermined area such that the error signal value associated with the signal space constellation point being within the predetermined area or on a boundary thereof contributes to an amplitude peak reduction and such that an error rate associated with an erroneous detection of a receivable version of the transmit signal due to combining the input signal with the error signal is minimized.

For example, the input signal is a multi-carrier signal resulting from frequency-time transformation of spectral values associated with sub-carriers. Therefore, a spectral representation of the input signal comprises a set of spectral values being assigned to a set of sub-carriers, wherein a spectral value in the set of spectral values results from assigning a number of information values to a certain signal space constellation point according to a mapping scheme or, equivalently to a modulation scheme, for example according to a QAM scheme. In order to determine the predetermined area such that both conditions mentioned above, namely optimum reduction of the amplitude peaks along with minimized or at least not-increased bit error rate, the inventive means for determining the predetermined area is configured for determining the predetermined area in dependence on an error probability associated with the modulation or mapping scheme. The error probability may be a bit error probability or a symbol error probability depending on the modulation scheme, on a signal to noise ratio, on a channel attenuation etc.

For example, a bit error probability associated with a QPSK scheme differs from a bit error probability of a 16 QAM scheme. It has further been found, that a contour plot of the bit error probability in the signal space domain determines the predetermined area or a number of predetermined areas in dependence on the bit error probability. This issue will be discussed later in detail in connection with the embodiments of FIGS. 3a to 3d.

For example, the multi-carrier modulation scheme is formed such that different spectral values result from assigning different numbers of information values to different signal space constellation points in the signal space domain according to a plurality of modulation schemes. In this case, the means 107 for determining may be configured for determining a plurality of predetermined areas in dependence on the plurality of used modulation schemes. For example, a further spectral value in the set of spectral values results from assigning a further number of information values to a further certain signal space constellation point according to a further modulation scheme or to a further mapping scheme, for example according to a 64 QAM. The means 107 for determining the predetermined area may be configured for determining a further predetermined area in dependence on a further bit error probability associated with the further modulation scheme. Since the spectral values are associated with sub-carriers, for sub-carriers being associated with the same modulation scheme, a common predetermined area in dependence on the same modulation scheme can be determined. In other words, the means for determining may be configured for determining the predetermined area sub-carrier-wise.

For example, the modulation scheme or the further modulation scheme mentioned above belongs to a quadrature amplitude modulation (QAM), or to a phase shift keying (PSK) or to a quarternary phase shift keying (QPSK) or to an amplitude shift keying (ASK), just to name a few of possible modulation schemes.

The preliminary error signal values in frequency domain may correspond to sub-carriers, to which the spectral values associated with the spectral representation of the input signal are assigned. For example, a preliminary error signal value is assigned to a sub-carrier to which the spectral value is assigned, and a further preliminary error signal value is assigned to a further sub-carrier to which the further spectral value is assigned. In this context, the term sub-carrier refers to a sub-carrier frequency.

The means 107 for manipulating may be in this case configured for manipulating a magnitude and a phase of the preliminary error signal value to obtain an error signal value being associated with a signal space constellation point being within the predetermined area or on a boundary thereof, and/or for manipulating a magnitude and/or a phase of the further preliminary error signal to obtain a further preliminary error signal value being associated with a further signal space constellation point being within the further predetermined area or on a boundary thereof. In other words, signal space constellation points associated with different modulation or mapping schemes are individually processed. This processing can be performed in parallel, so that the manipulation is simultaneously performed.

In accordance with a further aspect of the present invention, the manipulation can sequentially be performed so that, for example, a first signal space constellation point is manipulated at a first time instant and a second signal space constellation point is manipulated at a further time instant in dependence on the current modulation scheme.

For example, the modulation scheme comprises a set of signal space constellation points which determine a possible distribution of signal space constellation points in the signal space domain according to the modulation scheme, e.g. according to QPSK, wherein information values are assignable to the set of signal space constellation points for transmission. For example, the set of signal space constellation points comprises a first subset of signal space constellation points associated with a first magnitude, and a second subset of signal space constellation points associated with a second magnitude being greater than the first magnitude. For the case of a QAM scheme, the first magnitude may be a magnitude of the inner signal space constellation points and the second magnitude may be the magnitude associated with the outer signal space constellation points or with the outermost signal space constellation points. The means (107) for manipulating may be configured for manipulating a preliminary error signal value associated with a signal space constellation point belonging to the first subset of signal space constellation points differently than an error signal value associated with a signal space constellation point belonging to the second subset of signal space constellation points.

Moreover, means 107 for manipulating may be configured for manipulating a preliminary error signal value associated with a sub-carrier, to which a spectral value is assigned, only when the certain signal space constellation point belongs to the first subset of signal space constellation points, and for providing the preliminary error signal value as the error signal value when the certain signal space constellation point belongs to the second subset of signal space constellation points. In other words, the means 107 for manipulating maintains the preliminary error signal value associated with the second subset of signal space constellation points unchanged.

In accordance with a further aspect of the present invention, only signal space constellation points associated with the second magnitude are manipulated, and the signal space constellation points associated with the first magnitude are maintained unchanged.

The means 107 for manipulating may comprise a magnitude limiter for limiting a magnitude of the preliminary error signal value, wherein the magnitude limiter may be configured for limiting the magnitude of the preliminary error signal value in dependence on the modulation scheme. More specifically, the magnitude limiter may be configured for applying different magnitude limitation schemes to different sub-carriers, when different modulation/mapping schemes are used for different sub-carriers or for different sub-carrier sets. For example, an another spectral value associated with an another sub-carrier results from assigning an another number of information values to an another signal space constellation point in accordance with an another modulation scheme, wherein an another preliminary error signal value is associated with the another sub-carrier. The magnitude limiter may be configured for individually limiting the magnitudes of the preliminary error signal values in dependence on the modulation scheme and for individually limiting a magnitude of the another preliminary error signal value in dependence on the another modulation scheme.

For example, the magnitude limiter is configured for clipping the magnitude of the preliminary error signal value and/or for clipping the magnitude of the another preliminary error signal value.

In accordance with a further aspect of the present invention, the inventive apparatus for generating the error signal may further comprise means for determining the predetermined value range, or equivalently the predetermined area, in dependence on a channel state information. For example, the channel state information may be related to a current channel attenuation or to channel variations resulting from a non-zero velocity of the receiver etc. Since the communication channel may vary over time, the means for determining the predetermined value range may be configured for adaptively determining the predetermined value range in dependence on a varying channel state, for example in dependence on a varying channel attenuation, signal to noise ratio, channel delay or other channel characteristics.

The means for manipulating may further be formed for varying the preliminary error signal value in accordance with a predetermined constraint. The predetermined constraint may be, for example, the predetermined value range (or the predetermined area), or a predetermined bit error rate associated with the detection of a receivable version of the transmit signal, or a current channel state condition or a quality of service requirements, for example the available bandwidth, or a transmit power at the transmitter.

Referring again to the embodiment of FIG. 1, in order to obtain the distorted signal, the means 103 for distorting may comprise an distorting element for limiting the amplitude of the input signal in order to obtain a preliminary limited input signal, and a weighting element for weighting the preliminary signal with a weighting coefficient in order to increase an energy of the preliminary distorted signal to obtain the distorted signal having an increased energy. This case corresponds to increasing a magnitude of the corresponding signal space constellation points in the signal space domain in order to compensate the energy loss associated with the distorting, e.g. amplitude limiting. The amplitude limiting element may be operative for clipping the amplitude of the input signal. The weighting element may comprise a multiplier for multiplying the preliminary distorted signal with the weighting coefficient. This issue will be addressed later in detail.

In order to calculate the preliminary error signal to be provided to the means 107 for manipulating, the means 105 for calculating may comprise a subtracter for calculating a difference between the input signal and the distorted signal. The difference may be calculated in time domain and in frequency domain. For example, the means 105 for calculating comprises a time-frequency transformer for time-frequency transforming the difference to obtain the preliminary error signal in frequency domain. Accordingly, the means 105 for calculating may comprise a first time-frequency transformer for time-frequency transforming the distorted signal to obtain a transformed distorted signal and a second time-frequency transformer for time-frequency transforming the input signal to obtain a transformed input signal, so that the subtracter is formed for calculating a difference between the transformed input signal and the transformed distorted signal (between a spectral representation of the input signal and the spectral representation of the distorted signal) in order to obtain the preliminary error signal in frequency domain.

Additionally, the means 105 for calculating may comprise a filter in order to provide a filtered preliminary error signal as the preliminary error signal.

In the following, further aspects of the present invention related to the inventive reverse extending approach associated with back-manipulating will be described with respect to FIGS. 2b to 2l.

Figure 2B:
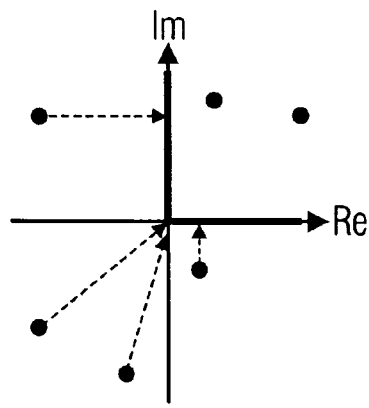
FIG. 2b to 2g demonstrate the inventive concept.
Figure 2C:
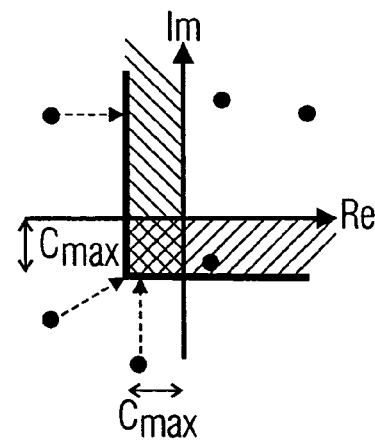
Figure 2D:
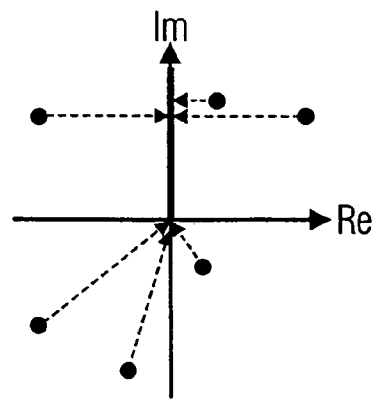
Figure 2E:
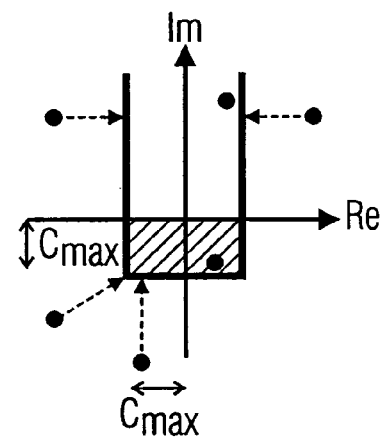
Figure 2F:
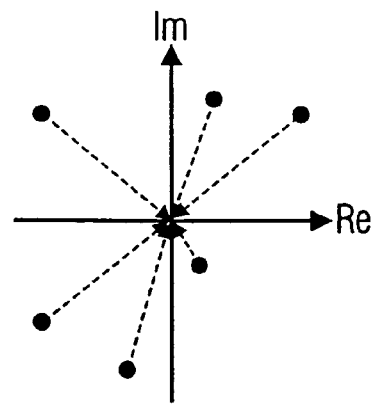
Figure 13:
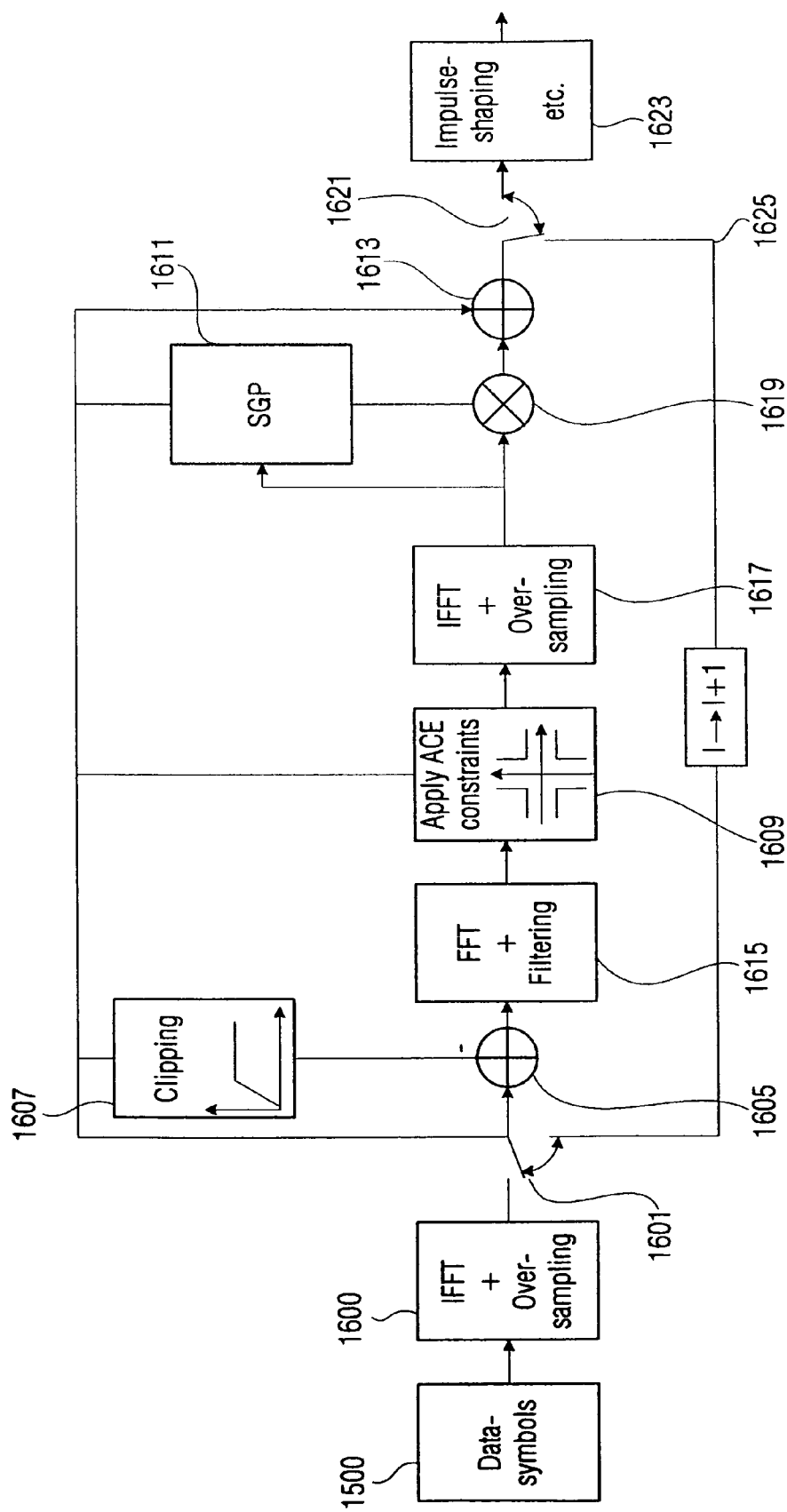
FIG. 13 shows a block diagram of a conventional ACE approach.

FIGS. 2b, 2d, and 2f visualize graphically how the ACE constraints in FIG. 13 are applied for three examples. The dots are the error signal $C_c^l$, and each dot corresponds to the error on one subcarrier. The ACE constraints move the dots as indicated by the arrows to form the signal $C^l$. The constraints have to distinguish, in which corner of the signal constellation the undistorted symbols $d^0$ are located. If QAM and not QPSK modulation is used, we have to distinguish furthermore the symbols on the constellation edges, which have for example the constraints in FIG. 2d, and the symbols in the inner of the constellation corresponding co the constraints in FIG. 2f.

Figure 2G:
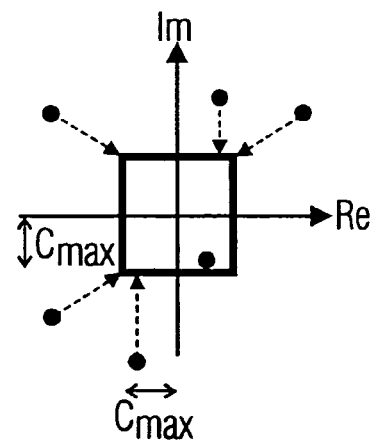

In contrast to that FIGS. 2c, 2e, and 2g show examples for alternative inventive constraints. We want to consider QPSK modulation first, which is shown in FIG. 2c. For the example QPSK symbol the inventive constraints are characterized by two negative extension regions (striped areas), i.e. either the real part of the elements of the extension vector $C^l$ or the imaginary part or both parts can become negative. For the other three possible QPSK symbols, generally, reverse extension regions are used accordingly, which can be either negative or positive.

One effect of the reverse extension regions is that the constraints will cause a smaller error, i.e. $(C_c^l - C^l)^H (C_c^l - C^l)$ becomes smaller. This smaller error is expressed by the smaller lengths of the arrows e.g. in FIG. 2c in comparison to FIG. 2b, showing a conventional extension of upper right corner symbol (QPSK or QAM). Due to the smaller error a better peak reduction can be achieved. Moreover, in case of successive iterations it can happen that a previous iteration caused a too high extension on some subcarriers. Only if reverse extension directions are allowed, this can be corrected in the following iterations by stepping back by some extent.

This feature to step back is known as "reverse-extension", see e.g. B. S. Krongold and D. L. Jones, "PAR Reduction in OFDM via Active Constellation Extension," in Int. Conference on Acoustics, Speech and Signal Processing, vol. 4, April 2003, pp. 525-528. However, the above reference conjectures that extra FFTs would be required for introducing reverse extension, which are not required when applying the inventive technique.

Next, we want to take a closer look on QAM modulation, e.g. 16 QAM. FIG. 2*e* shows how to treat subcarriers, which transmit QAM symbols on the constellation's upper edge. A corridor is allowed, into which the elements of the extension vector are moved. In the example the corridor is including a striped area for reverse-extension of the imaginary part and an additional unstriped area for forward and reverse extension of the real part. Whereas for the conventional ACE technique in the example only the imaginary part can be used for peak reduction, the inventive technique also allows the real part to contribute to peak reduction. For the inner QAM symbols in FIG. 2*g* there is a small extension area provided so that also the inner symbols can be used for peak reduction.

These two advantageous properties for QAM modulation are also available for the circular noise shaping technique. In this respect the realization of the inventive technique is an alternative to circular noise shaping. However, the given example of the inventive technique has lower computational complexity because the amplitude of the complex symbols has not to be calculated.

A parameter of the inventive technique is the maximum reverse extension $C_{max}$. If $C_{max}=0$, then no reverse extension is possible, which is identical to Improved ACE. For $C_{max}>0$ reverse extension is allowed up to the limit $C_{max}$ as indicated by the striped areas in FIG. 2*c*, showing the inventive extension of upper right corner symbol (QPSK or QAM), 2*e*, showing a conventional extension of upper edge symbol (only QAM), and 2*g*, showing the inventive extension of upper edge symbol (only QAM). Furthermore, the additional non-reverse extension in FIGS. 2*e* and 2*g* is chosen accordingly. If $C_{max}$ is chosen too large, the constraints are not effective any more and the error rate at the receiver will degrade.

In the following, a performance evaluation of the inventive approach will be described. The evaluation has been done as disclosed in A. Saul, "Comparison between Recursive Clipping and Active Constellation Extension for Peak Reduction in OFDM Systems," in Proc. *Int. Symp. on Wireless Personal Multimedia Communications,* vol. 1, October 2003, pp. 37-41. In order to evaluate the 00B radiation the PSD (PSD=power spectral density) of the modulated and peak reduced signal is estimated after distortion by an HPA. Furthermore, the distorted QPSK signal is sent over an AWGN channel, and the encoded BER at the output of a conventional OFDM receiver is measured. This measurement is repeated for several clipping ratios. For comparison of the results it is sufficient to look at the PSD at the normalized frequency $f/f_s=0.6$ and at the $E_b/N_0$ that is required to achieve a target BER, which has been chosen as BER=$10^{-3}$. The system parameters can be found in FIG. 2*h*.

Figure 2I:
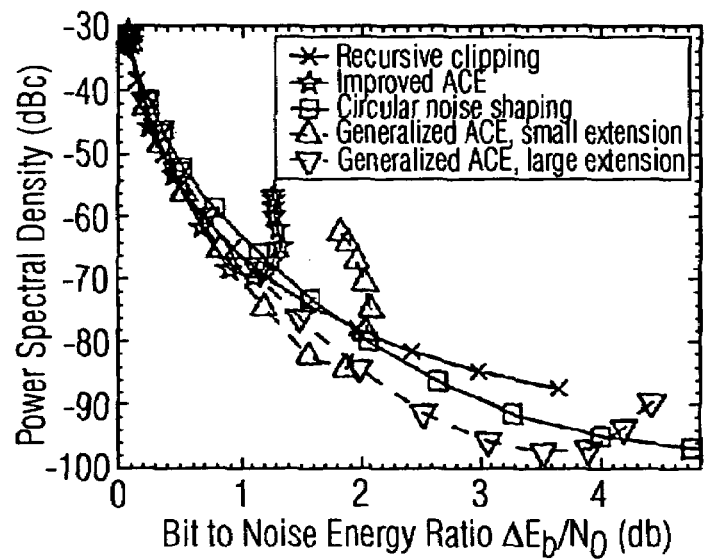
FIGS. 2i and 2j show performance comparison results.
Figure 2J:
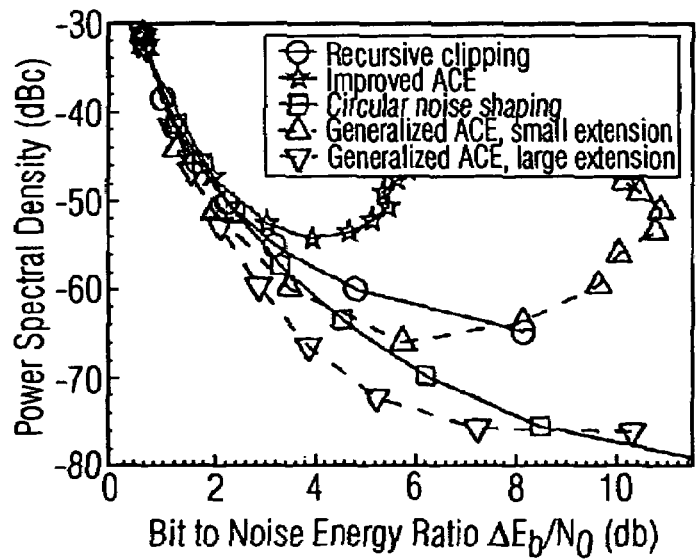

The performance comparison for QPSK transmission on N=1024 subcarriers can be found in FIG. 2*i*. The y-axis shows the PSD at the normalized frequency $f/f_s=0.6$, and the x-axis shows the loss $\Delta E_b/N_0$ against an undistorted transmission under the condition of the target BER=$10^{-3}$. The top left corner of the plot where all curves meet corresponds to the highest clipping ratio of CR=12 dB. When following the curves to lower PSDs and higher losses in $E_b/N_0$ the clipping ratio decreases.

In FIG. 2*i*, "Generalized ACE, small extension" is the inventive technique for $C_{max}\approx 0.0110\sqrt{E\{d^H d\}}$, and "Generalized ACE, large extension" is the inventive technique for $C_{max}\approx 0.0442\sqrt{E\{d^H d\}}$. It can be seen that for PSD<−70 dBc the inventive technique clearly outperforms all investigated conventional techniques. The parameter $C_{max}$ can be used to adapt the technique to the required out-of-band radiation.

In FIG. 2*g* the performance for 16 QAM mapping is investigated. Here, "Generalized ACE, small extension" is the inventive technique for $C_{max}\approx 0.0037\sqrt{E\{d^H d\}}$, and "Generalized ACE, large extension" is the inventive technique for $C_{max}\approx 0.0200\sqrt{E\{d^H d\}}$. For most PSDs the inventive technique with large extension performs superior to all other investigated techniques in the chosen scenario. For weak PSD requirements of PSD>−50 dBc the inventive technique with small extension seems to have a slight advantage. The region PSD<−76 dBc might be covered by the inventive technique for a different parameter $C_{max}$. However, this is of minor relevance due to the strong degradation in $E_b/N_0$, which can be expected.

For many optimization techniques, an optimum cannot be found in one step. Instead, the optimum may be found stepwise starting from a starting point, wherein a plurality of steps is to be performed. If one of these-steps exceeds the optimum, it is necessary to make a step back. The ACE technique is also some kind of optimization technique, which reduces peaks. These contacts, stepping back is called reverse extension. The starting point is the original signal. The optimization goal is the peak-reduced signal. Each step is the "error signal", which is also called extension signal in the case of ACE. Contrary to the prior art ACE approaches, which do not apply reverse extension, the present invention provides a concept of reverse extension in the case of ACE. This concept is demonstrated in FIG. 2*k* showing an FFT of an original signal, an FFT of clipped signals, an FFT of possible weighted clipped signal, an FFT of a preliminary error signal, and an FFT of a preliminary error signal in a magnified scale.

It is to be noted that the signal may contain four overlapping clouds, wherein, by the way of example only, only the sub-carriers will be considered, which correspond to the upper right quadrant.

Figure 2K:
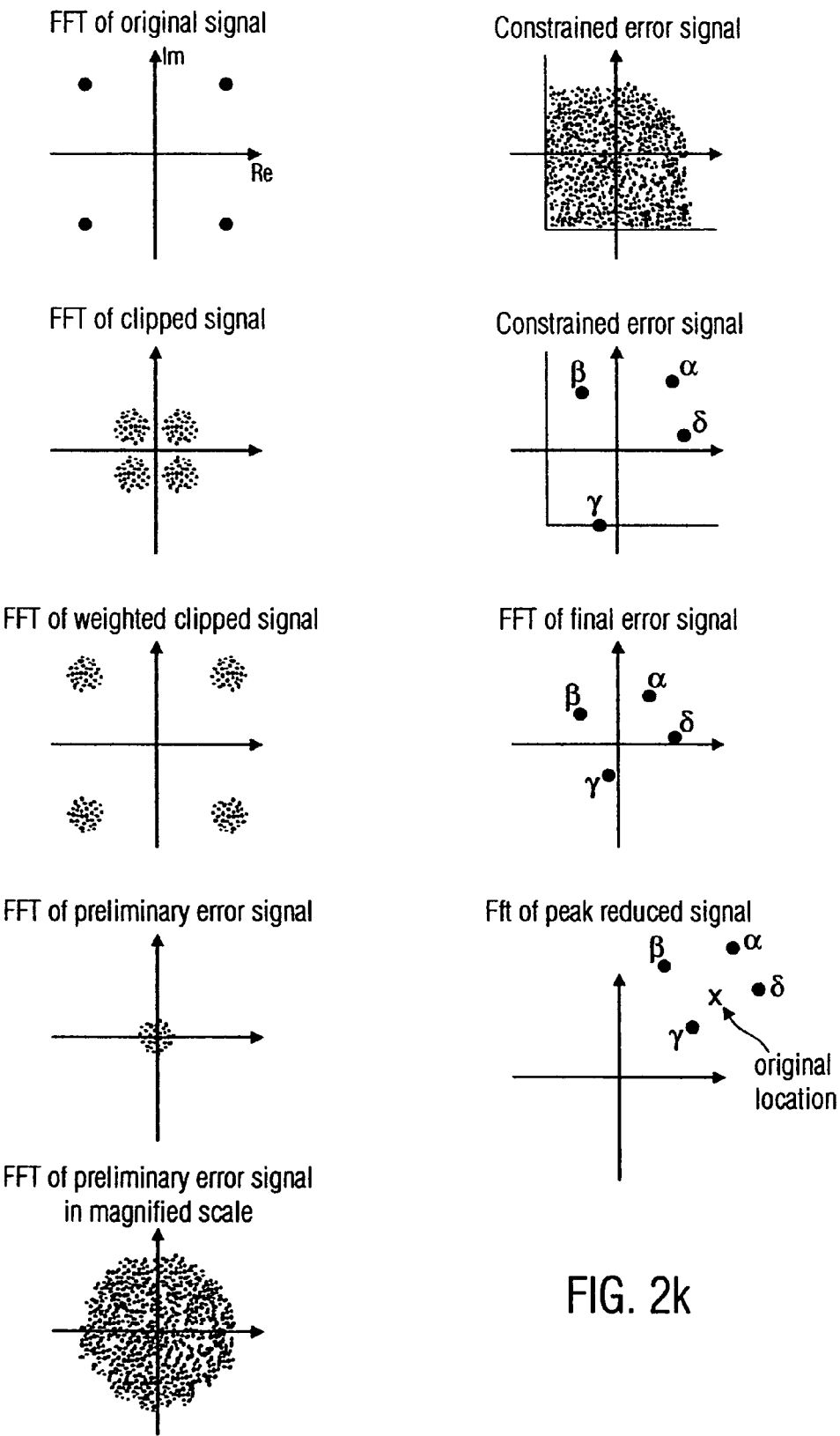

FIG. 2*k* further shows a distribution of a constraint error signal and, by the way of example only, four representatives α, β, γ, and δ of the constraint error signal. In addition, FIG. 2*k* shows an FFT of a final error signal, which is a scaled version of the error signal shown in a diagram above. In FIG. 2*k*, an FFT of a peak-reduced signal is shown, wherein by the way of example only, only the upper right quadrant is considered.

The above diagrams are obtained in a first iteration step. The following diagrams shown in FIG. 2*l* are with respect to a second iteration step, by the way of example only. In particular, FIG. 2*l* shows an FFT of a preliminary error signal in a magnified scale. Further, FIG. 2*l* shows a constraint error signal, wherein a previous location of γ is indicated. In addition, an FFT of a final error signal (a scaled version of the constraint error signal described above) is depicted. Finally, FIG. 2*l* shows an FFT of a peak-reduced signal, wherein non-reverse extensions and reverse extensions are explicitly depicted.

Similar considerations apply not only for QPSK cases considered in FIGS. 2*k* and 2*l* by the way of example only, but also for a plurality of different relation schemes, for example for 16 QAM.

As has been mentioned before, conventional clipping techniques consider the ICI due to clipping noise as being white and Gaussian distributed. In conclusion it is tried to minimize the interference power. In accordance with the present invention, however, a different approach is followed. For example, it can be investigated, which distribution of the interference is desirable under the condition that the receiver is not modified.

An uncoded multicarrier transmission on N sub-carriers over an AWGN (AWGN=Additive White Gaussian Noise) channel is assumed by the way of example only. In the following, the index prime (') stands for a real part of a variable whereas double prime (") denotes an imaginary part. Firstly, a signal of only one sub-carrier is considered so that the index n can be dropped for the sub-carrier number in the equations for the sake of notational simplicity.

On the considered sub-carrier the complex QAM symbol $$d = d' + jd'', \quad d', d'' \in R$$

is sent with energy $$\tilde{E}_s = d'^2 + d''^2.$$

For peak reduction the complex interference term $$\Delta d = \Delta d' + j\Delta d'', \quad \Delta d', \Delta d'' \in R$$

is added at the transmitter. The energy of the interference is $$\Delta \tilde{E}_s = (d' + \Delta d')^2 + (d'' + \Delta d'')^2 - \tilde{E}_s$$
$$= \Delta d'^2 + \Delta d''^2 + d' \Delta d' + d'' \Delta d'.$$

The peak reduced signal $$S = d + \Delta d$$

is then transmitted over the equivalent baseband frequency domain AWGN channel where noise $N_{AWGN}$ with power $2N_0 f_s$ is superposed. $f_s$ is a sampling rate of the system. If there should be some non-linear distortion of the signal, e.g. caused by the HPA, this can be approximately viewed as AWGN by the receiver and shall be included in the noise power $N_0$. The received sub-carrier $$R = S + N_{AWGN}$$

is then decided at the detector.

Naturally, the bit error probability on the sub-carrier depends on the signal constellation. Although the following derivations can be performed for any signal constellation, in the following Gray-mapped 4 QAM is considered by the way of example only, where the real part transmits the first bit and the imaginary part transmits the second bit of the symbol. In this embodiment, a signal space constellation point transmits, therefore, two bits. In this case, the probability that for the sent bit $S' = d' + \Delta d'$ the received bit. R' is not detected (decided), correctly is $$Pr(R' < 0 \mid S' = d' + \Delta d') = \int_{-\infty}^{0} \frac{1}{\sqrt{\pi N_0}} e^{-\frac{(R' - d' - \Delta d')^2}{N_0}} dd$$
$$= \frac{1}{2} \operatorname{erfc} \sqrt{\frac{(d' + \Delta d')^2}{N_0}}$$

and correspondingly, if $S' = -(d' + \Delta d')$ has been sent. The bit error probability $P_b'$ for d' and the bit error probability $P_b''$ and d'' are $$P_b' = \frac{1}{2} \operatorname{erfc} \sqrt{\frac{(d' + \Delta d')^2}{N_0}}, \quad P_b'' \frac{1}{2} \operatorname{erfc} \sqrt{\frac{(d'' + \Delta d'')^2}{N_0}}$$

In the following, all sub-carriers will be considered, i.e. the index n is used to indicate the carrier number. If every sub-carrier is distributed by a term $\Delta d_n$, then the total energy of the OFDM symbol is $$E_s = N\tilde{E}_s + \sum_{n=0}^{N-1} \Delta \tilde{E}_{s,n}.$$

The bit error probability on each carrier is $$P_{b,n} = \frac{P_{b,n}' + P_{b,n}''}{2}.$$

With the above equations, the overall bit error probability is $$P_b = \frac{1}{N} \sum_{n=1}^{N} P_{b,n}$$
$$= \frac{1}{4N} \sum_{n=0}^{N-1} \left( \operatorname{erfc} \sqrt{\frac{E_s}{N_0} \frac{(d_n' + \Delta d_n')^2}{N\tilde{E}_s + \sum_{n=0}^{N-1} \Delta \tilde{E}_{s,n}}} + \operatorname{erfc} \sqrt{\frac{E_s}{N_0} \frac{(d_n'' + \Delta d_n'')^2}{N\tilde{E}_s + \sum_{n=0}^{N-1} \Delta \tilde{E}_{s,n}}} \right)$$

In order to find an advantageous distribution of the ICI $\Delta d_n$, a dependency on the error probability $P_b$ should, preferably, be visualized. To do so, it is useful to simplify the scenario. For example, a number of variables appearing in the above equation can be reduced by making an approximation that allows ICI only on single sub-carriers, i.e. $\Delta d_n = 0$ for all sub-carriers except one. By doing so, the following bit error probability of the OFDM signal with one disturbed carrier is obtained $$P_b = \frac{1}{2N} \left( \frac{1}{2} \operatorname{erfc} \sqrt{\frac{E_s}{N_0} \frac{(d' + \Delta d')^2}{N\tilde{E}_s + \Delta \tilde{E}_s}} + \frac{1}{2} \operatorname{erfc} \sqrt{\frac{E_s}{N_0} \frac{(d'' + \Delta d'')^2}{N\tilde{E}_s + \Delta \tilde{E}_s}} + (N-1) \operatorname{erfc} \sqrt{\frac{E_s}{N_0} \frac{\tilde{E}_s}{N\tilde{E}_s + \Delta \tilde{E}_s}} \right)$$

Figure 3A:
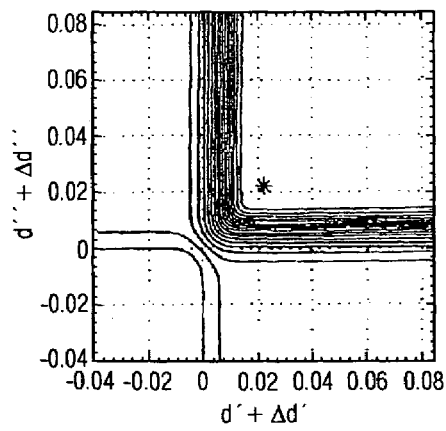
FIG. 3 shows bit error probabilities diagrams in a signal space domain.

FIG. 3*a* shows a graphical representation of the above equation for N=1024 sub-carriers and $E_b/N_0$=10 dB with a transmitted QPSK symbol WLOG $d=(1+j)/\sqrt{2}$. A location of the undistorted QPSK symbol $\Delta d=0$ is marked with a star. In other words, the contour plots of the bit error probability determine areas (regions) in the signal space domain associated with resulting bit error probabilities.

Figure 3C:
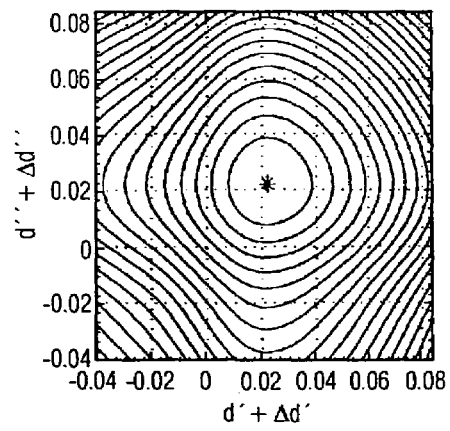
Figure 3B:
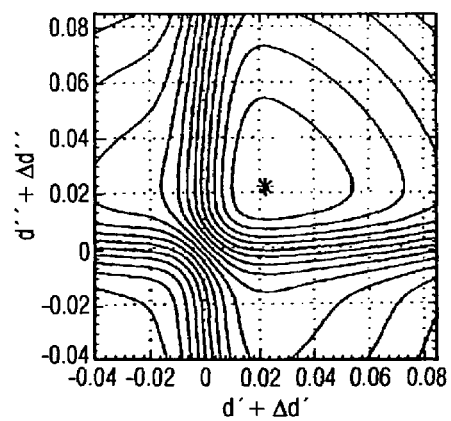

In FIGS. 3b and 3c, $E_b/N_0=5$ dB and $E_b/N_0=0$ dB is used as parameter, respectively.

Figure 3D:
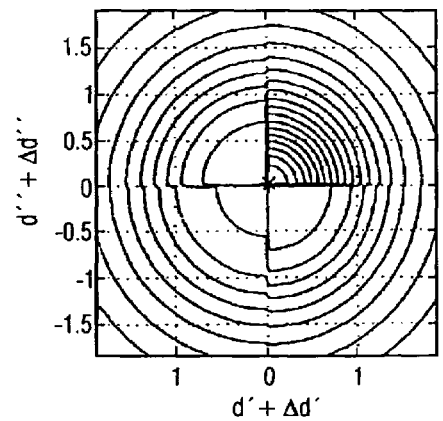

FIG. 3d shows the same curves as FIG. 3a for $E_b/N_0=10$ dB in a larger scale, i.e. for higher distortion $\Delta d$. The contour lines show locations of the same bit error probability, the x-axis and the y-axis indicate the real part d'+$\Delta$d' and the imaginary part d"+$\Delta$d" of the distorted QPSK symbol, respectively.

In order to find an interpretation of the contour plots discussed above, two opposite effects that the distortion $\Delta d$ has on the error rate should be considered. On the one hand, if the 4 QAM symbol, which corresponds to the QPSK symbol, approaches the decision borders, a probability of a wrong decision of this specific sub-carrier increases. On the other hand, the energy that is spent for the distorted sub-carrier can become smaller so that all other sub-carriers transmit with slightly more energy in order to fit the given $E_s/N_0$, and the error probability of the other sub-carriers improves. An analogous argumentation can be done for the case that the distortion $\Delta d$ leads away from the decision borders. In that case, the error probability of the effected sub-carrier decreases, whereas the error probability of the other sub-carriers becomes slightly worse.

If the channels noise power is weak, which case is depicted in FIG. 3a by the way of example, then the effects of the increased bit error probability for the distorted sub-carrier dominate the total error rate. Therefore, it is advantageous to avoid sub-carriers to come too close to the decision borders. If there is a need to transmit at low $E_s/N_0$ on the other hand, it is also important not to waste too much energy $E_s$ for the distorted sub-carrier as is shown for example in FIG. 3c, and a more circular distribution of the distortion is advantageous. As can be seen in FIG. 3d, even for a relatively high $E_s/N_0$ there is a limit for the distortion $\Delta d$.

The inventive peak reduction technique exploits the fact that the ICI can be shaped in such a way that all distorted sub-carriers are (approximately) located on or inside the regions (areas) determined by the curves shown in FIGS. 3a to 3d. Simultaneously, a degradation of the receiver's bit error rate can be limited.

In the following, the active constellation extension technique mentioned above will be considered in detail.

As is depicted in FIG. 13, the clipped signal $x_c^l$ is subtracted from the unclipped signal $x^l$ in order to form the clipped signal portion $$c_c^l = x^l - x_c^l.$$

The clipped signal portion of the factor L oversampled signal is transformed into frequency domain, and at the same time it is filtered. This is done by multiplication with a Fourier matrix of size N×NL, which has the elements $$F_{m,n}^z \triangleq e^{-j2\pi \frac{m,n}{N}}.$$

Hereby, the following vector is obtained $$C_c^l = F_{m,n}^z c_c^l,$$

containing the filtered clipped signal portion in frequency domain.

As has been mentioned above, the subtraction can also be performed in frequency domain, where two FFT and filter blocks are used in order to transform the clipped signal $$X_c^l = F_{m,n}^z x_c^l$$

and the unclipped signal $$X^l = F_{m,n}^z x^l$$

separately.

For a moment, it will be assumed in the following that the inventive weighting factor $w^l$ is one, wherein l denotes a number of the input signal, i.e. the input signal is the l-th input signal. In frequency domain, the following result is obtained $$C_c^l = X^l - X_c^l$$

FIGS. 4a and 4b show signal space constellation points associated with the clipped signal $X_c^0$ for a clipping ratio of 8 dB and 0 dB (one QPSK symbol). As can be seen, for high clipping ratios a couple of sub-carriers can be found within an area 401 that can be used for peak reduction (dots in the outer corners). Contrary thereto, for low clipping ratios most sub-carriers correspond to an extension direction that is not allowed. According to the known ACE algorithm, all non-acceptable extension directions are set to zero and will, therefore, not contribute to peak reduction. More specifically, Sub-carriers in the area 401 fully contribute to peak reduction. Sub-carriers in the area 402 do not contribute to peak reduction. Sub-carriers in the area 403 only contribute to peak reduction with imaginary part, since the real part of the extension vector will be set to zero. Sub-carriers in the area 404 only contribute with real pert, since the imaginary pert of the extension will be set to zero.

However, a low clipping ratio is desirable, if a low OOB radiation should be achieved. As a result, the known ACE technique fails to achieve very low OOB radiation.

As can be seen from FIG. 4b, the reason for the problems associated with low clipping ratios is the reduced power of the clipped and filtered signal. In order to compensate for the power loss, the inventive weighting factor $w^l$ is introduced. The weighting factor may be used for compensation of the power loss $$c_c^l = x^l - w^{(l)} x_c^l.$$

An alternative interpretation of the inventive weighting factor is that the clipped signal portion $c_c^l$ (distorted signal portion) should become uncorrelated to $x_c$, i.e.

$$E\{c_c^l x^{lH}\} = 0.$$

For a non-zero correlation value, the extension vector $\mu^{(l)} c^l$ is biased by the original symbol $x^l$, which has high peaks. Hence, also the bias has high peaks which are not reduced.

For a high number N of uncorrelated subcarriers, the input vector $x^l$ is a Gaussian stochastic process at least for the first iteration. Furthermore $$E\{x^l\} = 0$$

then the clipped signal can be expressed as $$x_c^l = \alpha^{(l)} x^l + n_c^l$$

wherein $n_c^l$ is the noise component and $\alpha^{(l)}$ is a constant depending on the clipping ratio and the statistical properties of $x^l$, and $n_c^l$ is uncorrelated to $x^l$, i.e.

$$E\{n_c x^{lH}\} = 0.$$

Using te above equations, the following is obtained for the correlation $$E\{n_c^l x^{lH}\} = (1-\alpha^{(l)}) E\{x^l x^{lH}\}.$$

This term can only be zero, if $\alpha^{(l)}=1$. In order to achieve this property, the weighting factor can be chosen as follows $$w^l = \frac{1}{\alpha^{(l)}}.$$

In other words, the above weighting factor is chosen such that the clipped signal portion and the input signal become uncorrelated.

An further choice of the weighting factor that perfectly compensates the power loss is $$w_1^l = \sqrt{\frac{X^{lH} X^l}{X_c^{lH} X_c^l}} = \sqrt{LN \frac{x^{lH} x^l}{X_c^{lH} X_c^l}}$$

wherein $X^l$ denotes an l-th input signal, $X_c^l$ denotes a l-th distorted portion of the input signal, both in frequency domain. Moreover, $x^l$ denotes the l-th input signal in time domain. The operator H denotes transposition and conjugation.

In order to determine the above-weighting factor, one additional FFT is needed for each iteration in order to determine $X_c^l$.

This corresponds to an increase of a computational complexity with respect to the Fourier transform operation by approximately 50%. In order to avoid the additional complexity, the power loss due to the filtering operation can be neglected. In this case, the weighting factor can be calculated in time domain as $$w_2^l = \sqrt{\frac{x^{lH} x^l}{x_c^{lH} x_c^l}}.$$

The expected power loss due to filtering is $$\frac{E\{w_1^{(l)}\}(l)}{E\{w_2^{(l)}\}(l)} = \sqrt{LN \frac{E\{x_c^{lH} x_c^l\}}{E\{X_c^{lH} X_c^l\}}}.$$

Therefore, the weighting factor $$w_3^l = \frac{E\{w_1^{(l)}\}(l)}{E\{w_2^{(l)}\}(l)} = \sqrt{LN \frac{E\{x_c^{lH} x_c^l\} x^{lH} x^l}{E\{X_c^{lH} X_c^l\} x_c^{lH} x_c^l}}$$

comes closer to the above expression for $w_1^l$ for nearly the same computation costs. In the above equations, $x_c$ denotes the distorted (e.g. clipped) portion of the input signal.

A further reduction in computational complexity is possible when an expectation value of the energy ratios described above instead of calculating the weighting factor for each symbol is calculated from the following equation $$w_4^l = E\{w_1^l\}(l) = \sqrt{LN \frac{E\{x^{lH} x^l\}(l)}{E\{X_c^{lH} X_c^l\}(l)}}.$$

For very low clipping ratios, the above weighting factors can be increased by introducing, for example, a constant factor $k^l$ $$w_5^l = k^l w_{1,2,3,4}^l.$$

Using the additional constant factor $k^l>1$, additional sub-carriers can be utilized for peak reduction, and for $k^l<1$ less sub-carriers are used. An optimum value for $k^l$ depends on the chosen clipping ratio respectively a target PSD. Moreover, the weighting factor may be chosen depending on an iteration number 1.

Additionally, the frequency domain signals may be filtered and the time domain signals may be oversampled. Only for the special case that the oversampling rate L=1, oversampling and filtering is not necessary.

In accordance with a further aspect, the present invention provides an apparatus for generating a transmit signal from an input signal, wherein the input signal comprises an amplitude peak resulting from a superposition of a plurality of frequency signals due to a multicarrier modulation scheme. The apparatus may comprise the apparatus for generating an error signal from the input signal, as has been described above, a processor for processing the error signal to obtain a processed error signal, and a combiner for combining a processed error signal with the input signal to obtain the transmit signal having a reduced amplitude peak.

Figure 5:
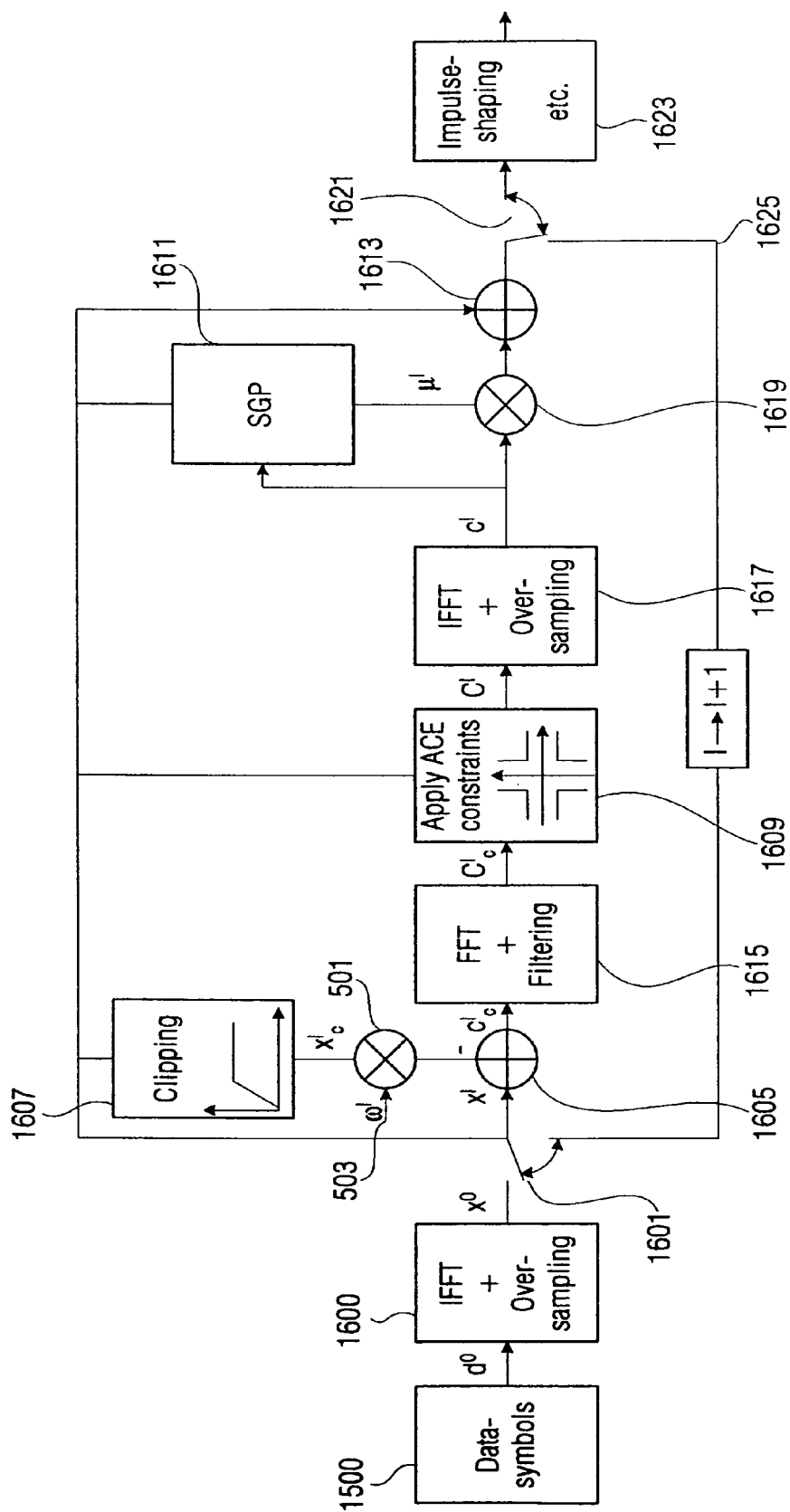
FIG. 5 shows a block diagram of an apparatus for generating a transmit signal from an input signal in accordance with a first embodiment of the present invention.

FIG. 5 shows an apparatus for generating a transmit signal in accordance with a first embodiment of the present invention.

Contrary to the apparatus shown in FIG. 13, the apparatus of FIG. 5 comprises a multiplier 501 coupled between the output of the clipping element 1607 and the input of the subtractor 1605. The multiplier 501 further comprises a further input 503.

As is shown in FIG. 5, the multiplier 501 is formed for weighting a distorted portion of the input signal, the distorted portion being provided by the clipping element 1607. The weighting factor is provided via the further input 503 of the multiplier 501 and can be pre-stored or pre-calculated as has been explained above. The subtractor 1605 provides an error signal in time domain by subtracting the weighted distorted portion (distorted signal) from the input signal provided via the input 1601. The clipping element 1607 corresponds to the previously mentioned means for distorting, the multiplier 501 is comprised by the inventive means for weighting and the subtractor 1605 is comprised by the inventive combiner.

The apparatus shown in FIG. 5 is formed for generating the error signal in time domain. The error signal is then transformed by the FFT 1605 and filtered in order to obtain an error signal in frequency domain. As has been mentioned above, the error signal may directly be provided in frequency domain, when the distorted signal and the input signal both are transformed in frequency domain before calculating the difference.

The transmit signal, which is a time domain signal, is provided via the output of the adder 1613, wherein the adder 1613 is an embodiment of the combiner for combining the processed error signal provided by the multiplier 1619 with the input signal for obtaining the transmit signal, which is, in the following, shaped by the impulse shaper 1623.

It is to be noted that the inventive processor may further comprise the elements 1609, 1611, 1613, 1617, 1619, and 1623.

Figure 6:
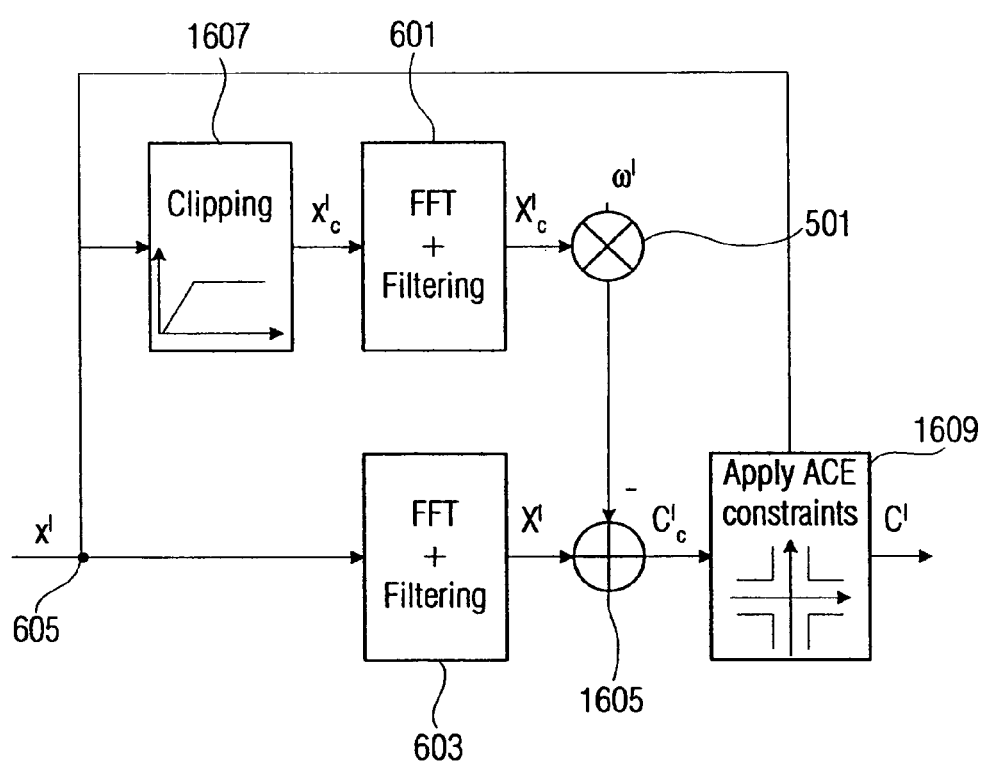
FIG. 6 shows a block diagram of an apparatus for generating an error signal from an input signal in accordance with a further embodiment of the present invention.

FIG. 6 shows an embodiment of an apparatus for generating an error signal in accordance with a further embodiment of the present invention.

Unlike the apparatus shown in FIG. 5, the apparatus of FIG. 6 comprises a first FFT 601 coupled between the amplitude limiting element 1607 and the multiplier 501. Additionally, the apparatus comprises a second FFT 603 coupled between an input 605 of the apparatus, via which the input signal is provided, and the subtractor 1605.

The first FFT 601 is formed for transforming the distorted portion of the input signal provided by the limiting element 1607 into a frequency domain. The limiting element 1607 is formed for amplitude clipping, by the way of example only. Accordingly, the second FFT 603 is formed for transforming the input signal into frequency domain. As is depicted in FIG. 6, the multiplier 501 is formed for multiplying the values of the spectral representation of the (e.g. amplitude limited) distorted portion provided by the amplitude limiting element 1607 by the weighting factor. The first and the second FFT my further perform filtering.

The multiplier 501 provides a distorted signal in frequency domain, wherein its coefficients corresponding to spectral values are weighted by the same weighting factor. The subtractor 1605 is formed for providing the error signal directly in frequency domain by subtracting the distorted signal in frequency domain from a spectral representation of the input signal provided by the FFT 603.

Figure 14A:
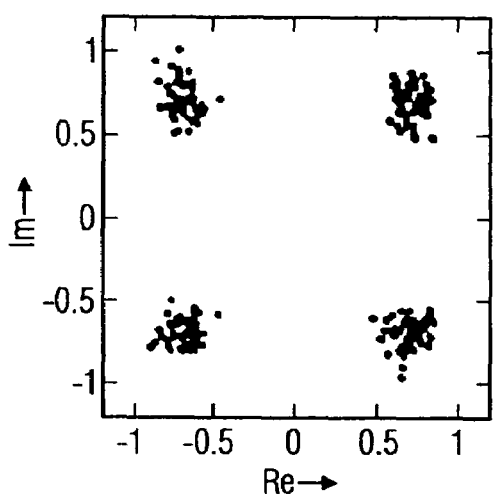
FIGS. 14a to 14b show distributions of signal space constellation points.
Figure 14B:
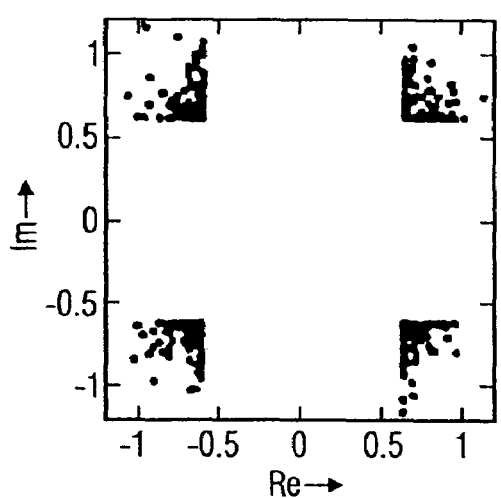

As has been explained above, a distribution of the clipping noise has an influence on the BER. The distribution of the prior art ACE technique shown in FIG. 14b approximately corresponds to the theoretical distribution shown in FIG. 3a for relatively high $E_b/N_0$. On the other hand, if the noise power becomes stronger in relation to the minimum distance between two symbols, e.g. if 16 QAM modulation or higher is used, a different noise distribution similar to that shown in FIGS. 3b and 3c may result in a better performance. Furthermore, if the required OOB radiation is very low, then the clipping ratio has to be chosen very low, and hence, the clipping noise power is quite high. Therefore, the right-angled noise distribution depicted in FIG. 3d may not be an optimum choice. Therefore, the present invention further provides a concept for providing, for example, a clipping noise distribution that minimizes the total error rate of a multi-carrier signal.

Figure 7:
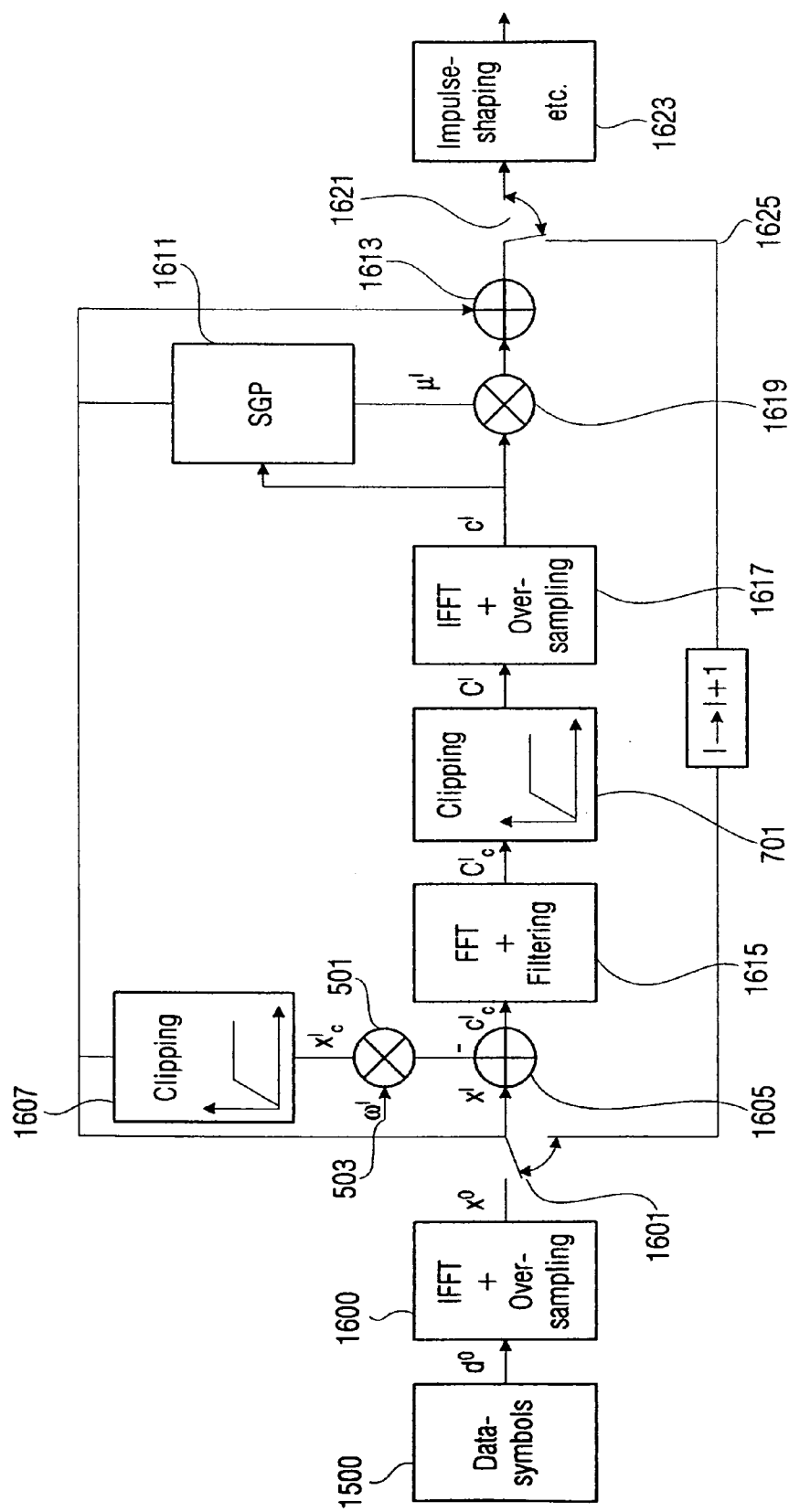
FIG. 7 shows a block diagram of an apparatus for generating a transmit signal from an input signal in accordance with a further embodiment of the present invention.

FIG. 7 shows an apparatus for generating a transmit signal in accordance with a further embodiment of the present invention.

In difference to the embodiment of FIG. 5, the apparatus shown in FIG. 7 comprises means 701 for manipulating a preliminary error signal provided by the FFT 1615 to obtain the error signal. The means 701 for manipulating, which is comprised by the inventive processor, is coupled between the FFT 1615 and the IFFT 1617. In other words, the means 701 replaces the ACE constraint block 1609.

The means 701 for manipulating is formed for varying a preliminary error signal value from a set of preliminary error signal values provided by the FFT 1615 in order to obtain the error signal in frequency domain. The error signal is then transformed into time domain by the IFFT 1617. As is shown in FIG. 7, the means 701 for manipulating may be operative for clipping a magnitude of the preliminary error signal values. The means for manipulating may be configured for varying the preliminary error signal such that the total error rate of the signal, e.g. of the multi-carrier signal, is reduced. For example, the (complex) error signal value may be in a predetermined set of values. The predetermined set of values may be obtained from a predetermined value range, by the way of example.

For example, the means for manipulating may be configured for varying the preliminary error signal value such that the error signal value is in a predetermined value range, wherein the predetermined value range may be obtained from calculating the error probabilities shown in FIGS. 3a to 3d, by the way of example only.

In comparison with the embodiment shown in FIG. 5, the ACE constraints in frequency domain are replaced by manipulating the preliminary error signal values in frequency domain. For example, the ACE constraints in frequency domain are replaced by clipping the clipped signal portion in frequency domain, wherein the clipped signal portion corresponds to the preliminary error signal. This example effectively limits the clipping noise power on every sub-carrier. The resulting distribution of signal space constellation points at the output of the adder 1613, i.e. after combining a version of the error signal in time domain provided by the multiplier 1619 with the input signal is circular.

Figure 8A:
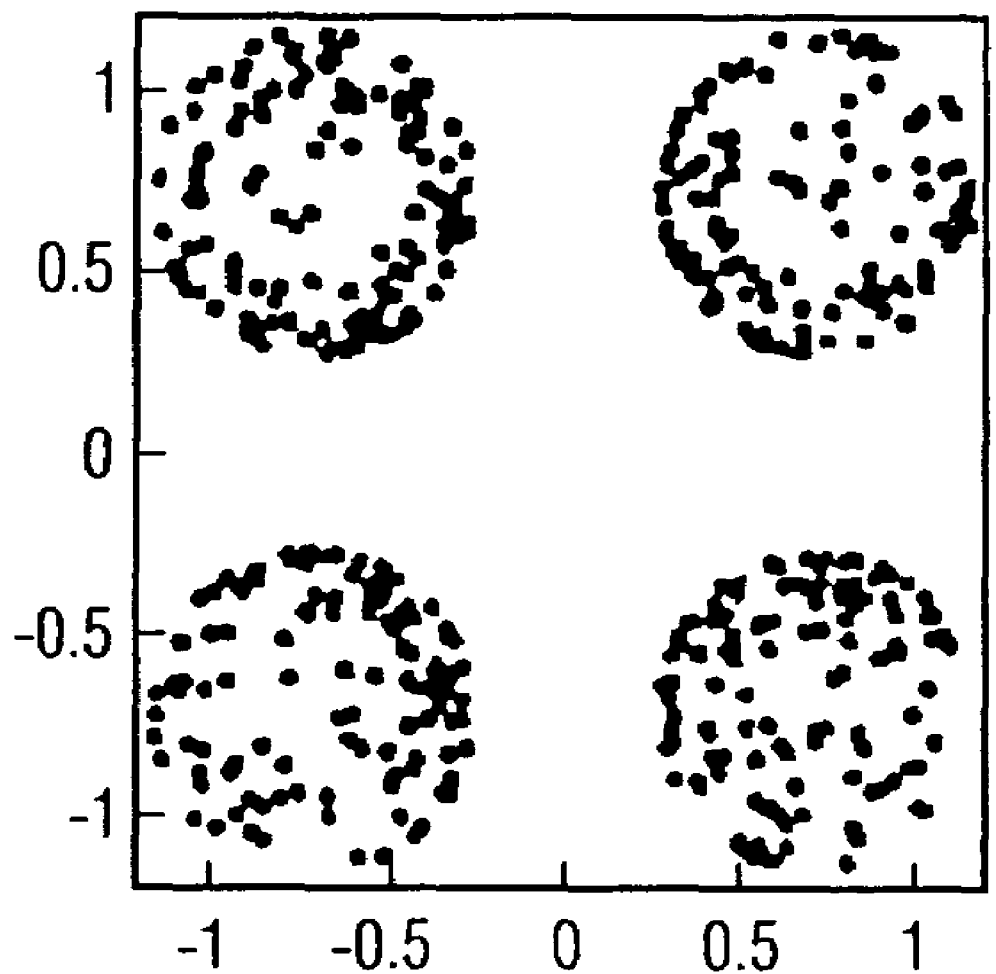
FIG. 8a to 8e show a distribution of signal space constellation points in accordance with the present invention.
Figure 8B:
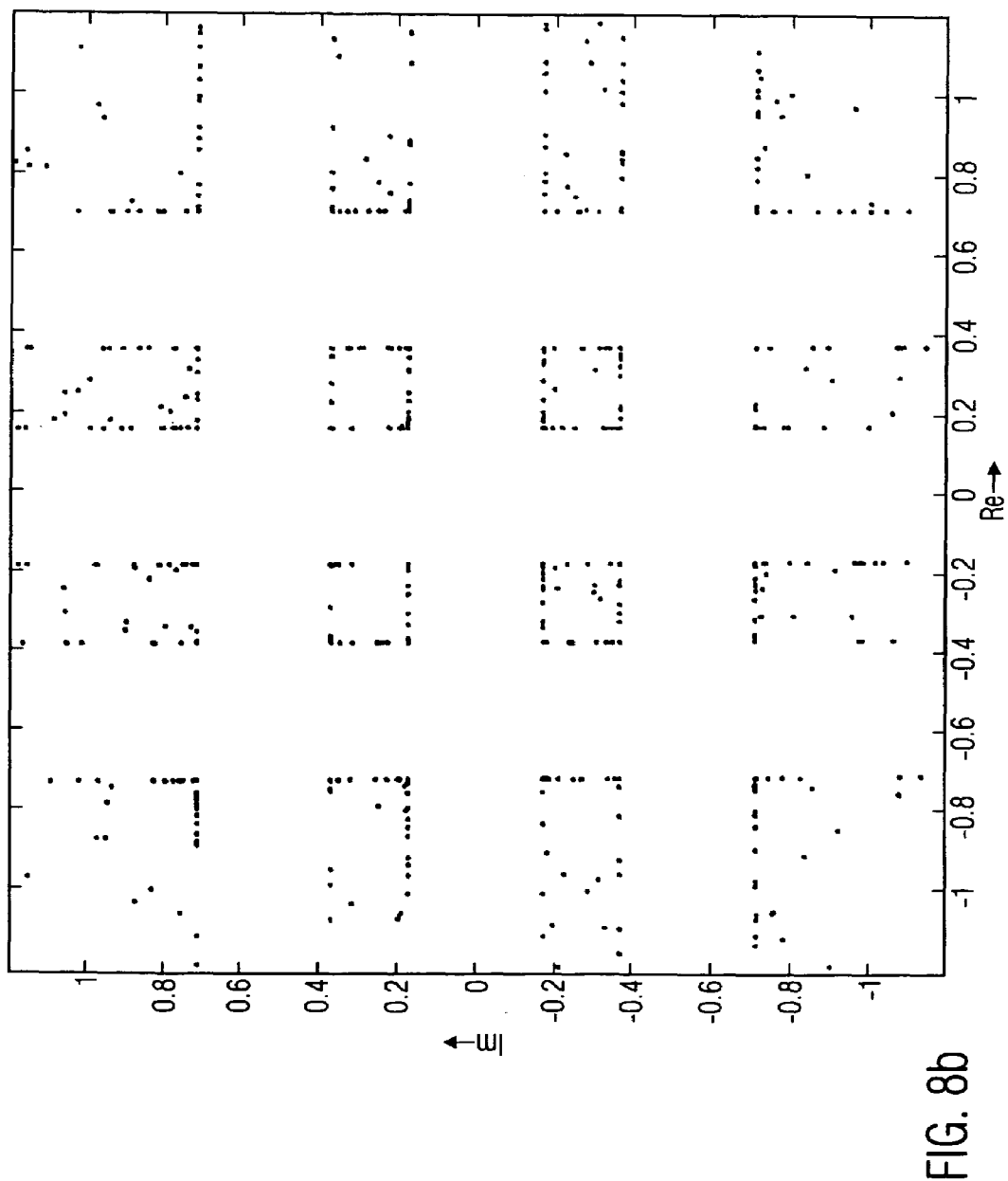
Figure 8C:
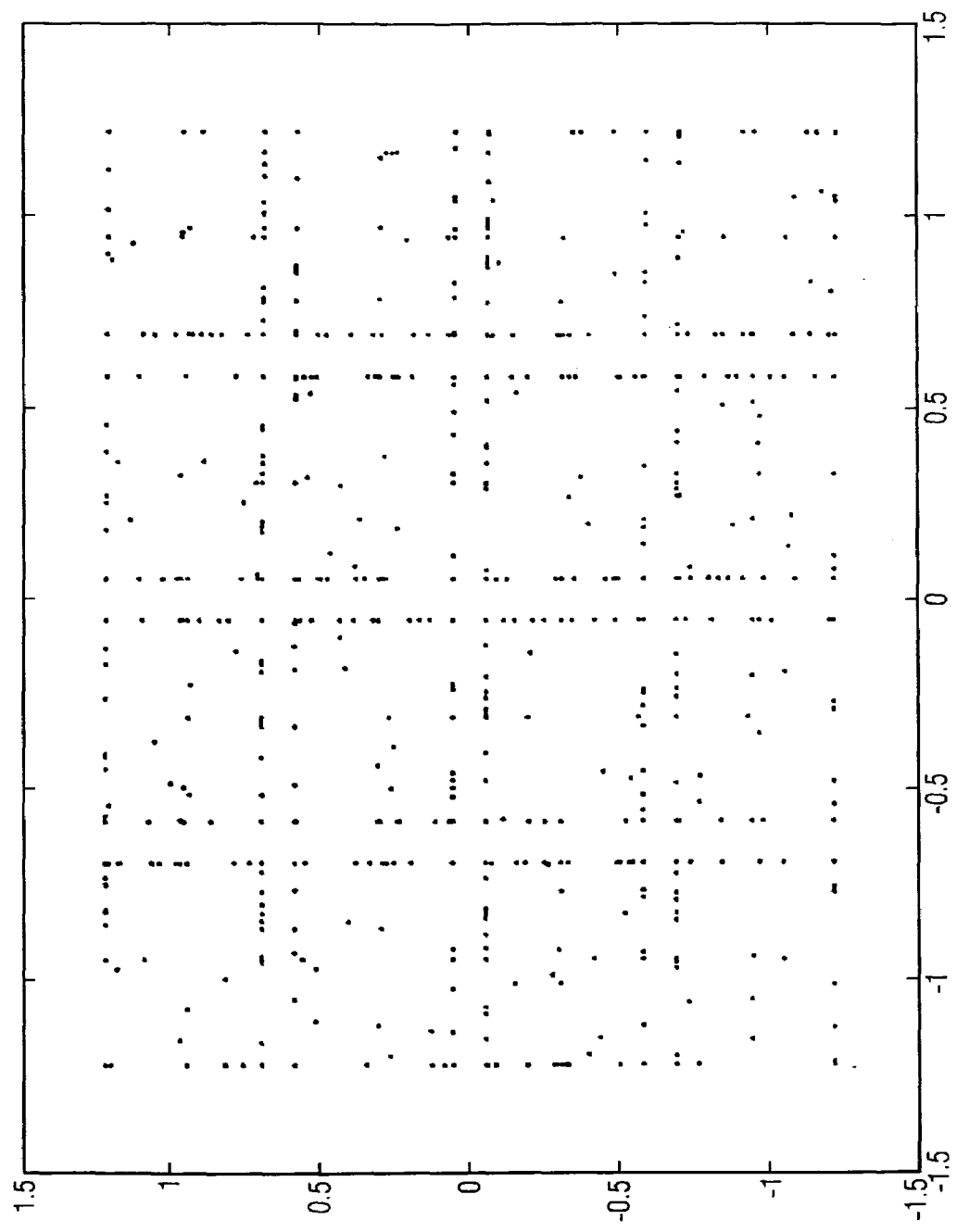
Figure 8D:
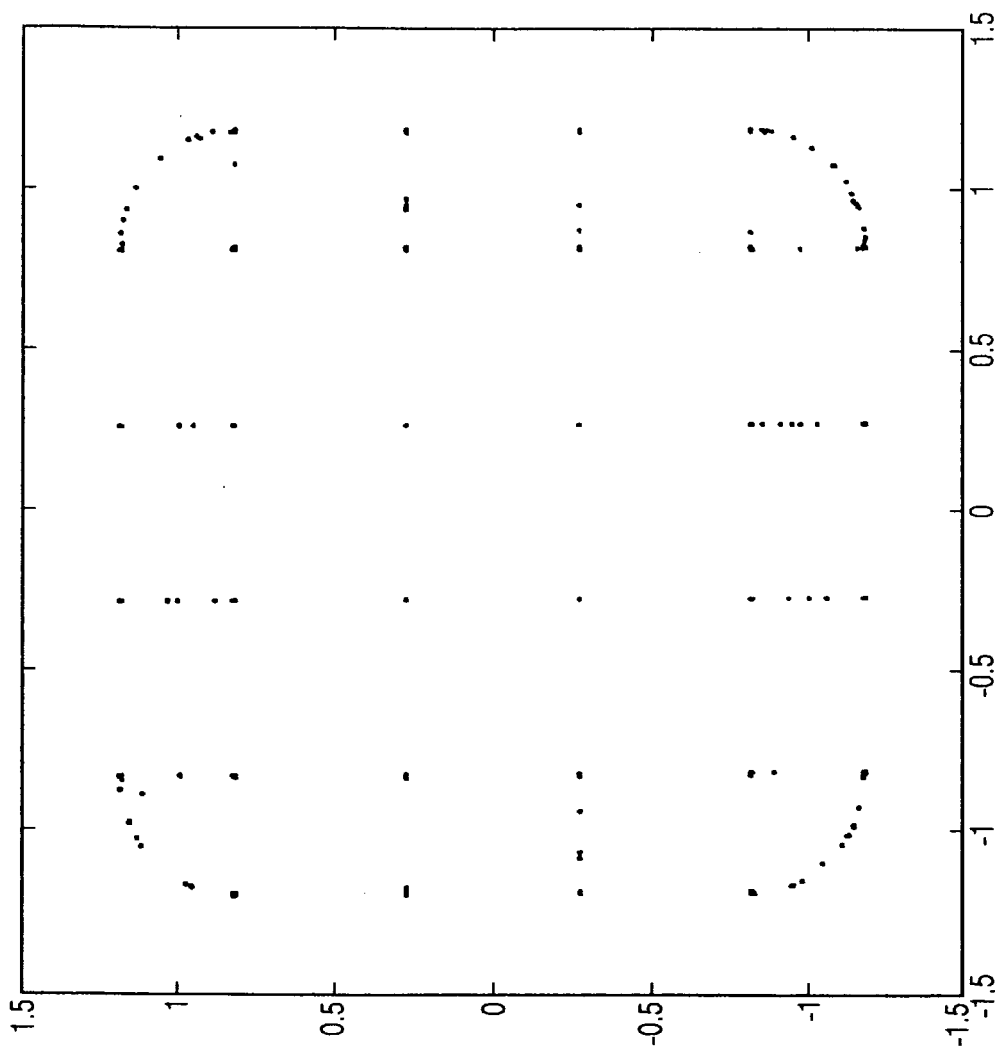
Figure 8E:
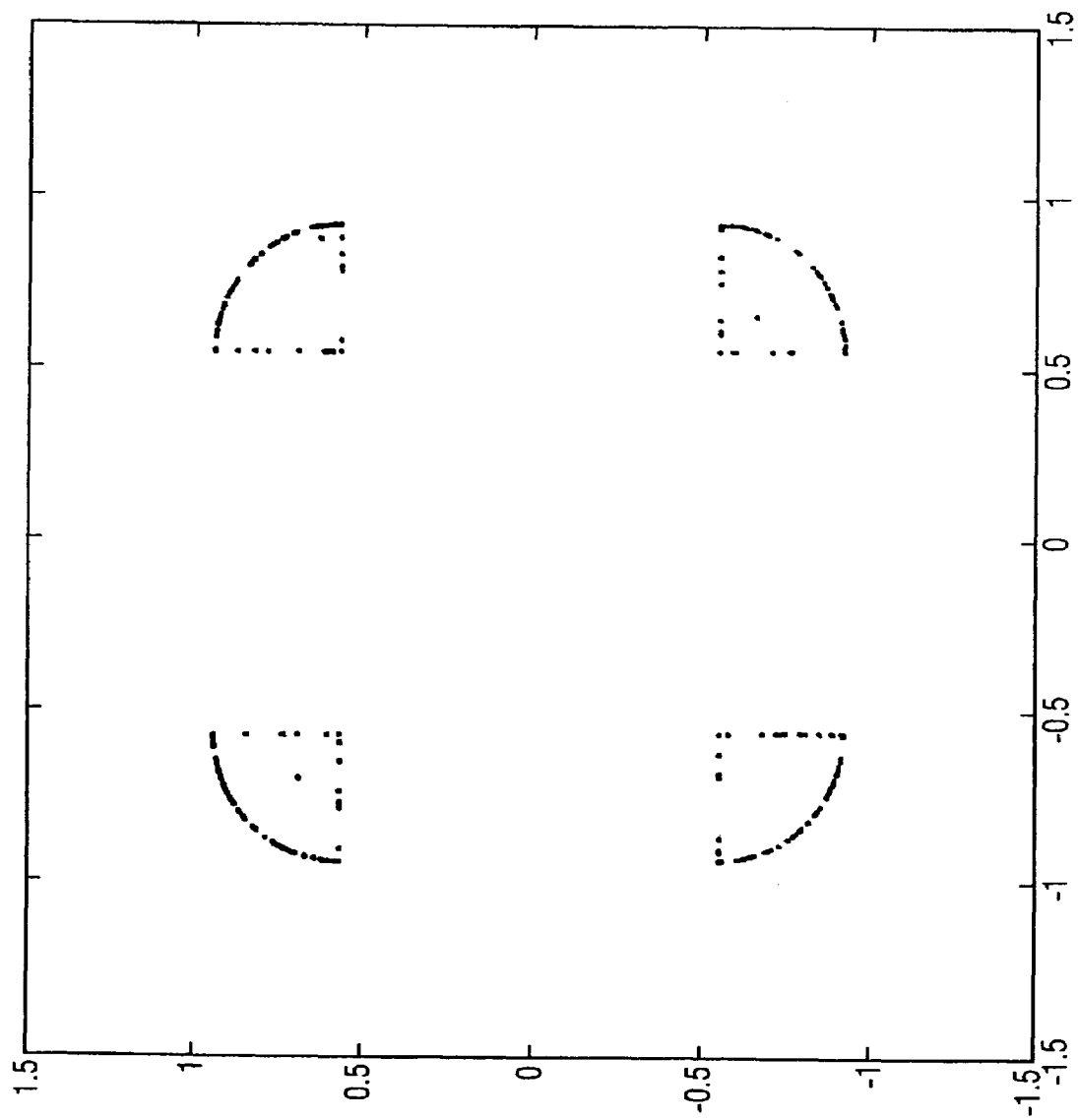

FIG. 8a shows a resulting signal space constellation after the clipping technique with a clipping ratio equal to 0 dB for the case of QPSK mapping (modulation). As is shown in FIG. 8, the means for manipulating varies the preliminary signal error values by limiting the magnitudes such that in a signal space domain a circular distribution results. However, the distribution may be rectangular or may have a shape determined by the error probability curves mentioned above.

FIGS. 8b, 8c, 8d and 8e show further signal space constellations for higher order QAM, e.g. 64 QAM, wherein the distribution has a right-angled shape or a shape of a segment of a circle.

An additional advantage of e.g. a circular distribution in comparison with a right-angle distribution is that during the iterative process of determining a good distortion vector $\vec{x} - \vec{x}^0$ it is possible to step back on some sub-carriers if the previous iterations result in a distortion term that is too big for cancelling out the peaks optimally. Stepping back means that the distorted QAM (QPSK) symbols automatically approaches the undistorted location in the signal plane (signal space domain) and $|\Delta d|$ decreases. Furthermore, all sub-carriers can be utilized for peak reduction. This is not possible using a conventional ACE approach with 16 QAM or higher constellations, by the way of example only.

Generally, other than circular distributions of the clipping noise can be achieved by replacing the ACE constraints with other constraints. For example, circular constellations can be used for inner symbols of a 16 QAM or higher mapping, and regular ACE constraints can be used for the outer symbols. In this context, the term "inner symbols" refers to signal space constellation points being associated with the smallest magnitude among signal space constellation points used by the mapping scheme. Accordingly, the term "outer symbols" refers to signal space constellation points having magnitudes being greater than the magnitudes of the inner symbols.

Furthermore, rectangular constellations can be used for the clipping noise. Rectangular constellations can be achieved with less computational complexity than circular constellations by clipping the real part and the imaginary part of the clipping noise separately. Generally speaking, different than circular constellations can be achieved by separately manipulating real parts and imaginary parts of the preliminary error signal values, respectively.

In accordance with a further aspect of the present invention, different constraints for each sub-carrier can be used.

Specially in the case of adaptive modulation where the modulation scheme (mapping scheme) varies over time and/or frequency, a clipping level (e.g. in the case of the circular distribution) for clipping the preliminary error signal values $C_c^l$ according to the signal mapping can be chosen, e.g. using a lower clipping level for sub-carriers with 16 QAM and a different clipping level which can be higher for sub-carriers with QPSK. However, the preliminary error signal values may be treated specifically, so that different distributions can be achieved.

Naturally, this includes the case that no limitation of the clipping noise is made for unused sub-carriers.

Furthermore, the adaptation can be performed with respect to the channel state information (CSI), the quality of service (QOS) requirements, for example, target BER, with respect to other criteria or to combinations of criteria. One of such criteria is, for example, an available bandwidth or a time delay.

A performance of the inventive, improved ACE technique and of the inventive clipping technique have been compared with three conventional clipping techniques, which have been described above. The performance comparison has been performed in the way that has been described in A. Saul, "Analysis of Peak Reduction in OFDM Systems Based on Recursive Clipping," in Proc. Int. OFDM-Workshop, vol. 1, September 2003, pages 103-107, and Saul, "Comparison between Recursive Clipping and Active Constellation Extension for Peak Reduction in OFDM Systems," in Proc. Int. Symp. On Wireless Personal Multimedia Communications, vol. 1, October pages 37-41.

Therefore, an equivalent digital baseband model of the transmission system is simulated, and two measurements are performed in order to investigate the effects on the OOB radiation and on the ICI.

In order to evaluate the OOB radiation, the PSD of the modulated and peak reduced signal is estimated after distortion by an HPA. Furthermore, the distorted signal is transmitted over an AWGN channel, and the uncoded BER at the output of a conventional OFDM receiver is measured. This measurement is repeated for several clipping ratios. For comparison of the results, it is sufficient to look at the PSD at the normalized frequency $f/f_s=0.6$, and at the $E_b/N_0$ that is required to achieve a target BER of e.g. $10^{-3}$ or $10^{-4}$.

The system parameters were chosen follows. The transmission scheme were OFDM using a number of sub-carriers N=1024. The symbol mappings where QPSK, 16 QAM and 64 QAM without channel coding. The channel was assumed to be an AWGN channel, wherein the oversampling rate (clipping) was equal to 2. The amplifier model was chosen according to the Rapp's SSPA (p=10). The output back-off was OBO=6 dB. The guard interval was equal to 11.1% and the roll-off factor was 11.1%. A mismatching was equal to 0.4 dB, wherein the target bit error rate were $10^{-3}$ and $10^{-4}$. The normalised frequency was $f/f_s=0.6$ and the clipping ratio was CR=0 dB . . . 12 dB.

The chosen parameters described above for the simulations are common for all clipping techniques. Furthermore, for recursive clipping, two iterations have been chosen, which is considered as being an optimum for the considered scenario. For ACE and improved ACE up to 3 iterations have been used, additional iterations would introduce a small performance improvement for low PSDs. For the inventive clipping technique are performed by the inventive means for manipulating up to 3 iterations have been chosen for QPSK mapping. For 16 QAM and 64 QAM mapping only 2 iterations have been used since most of the performance improvement is already achieved after 2 iterations.

The computational complexity of all techniques is mainly determined by the number of FFTs, so that a number of FFTs may be twice the number of iterations. None-recursive clipping corresponds to one iteration in this respect. One iteration means that the peak reduction procedure is not repeated.

Figure 9A:
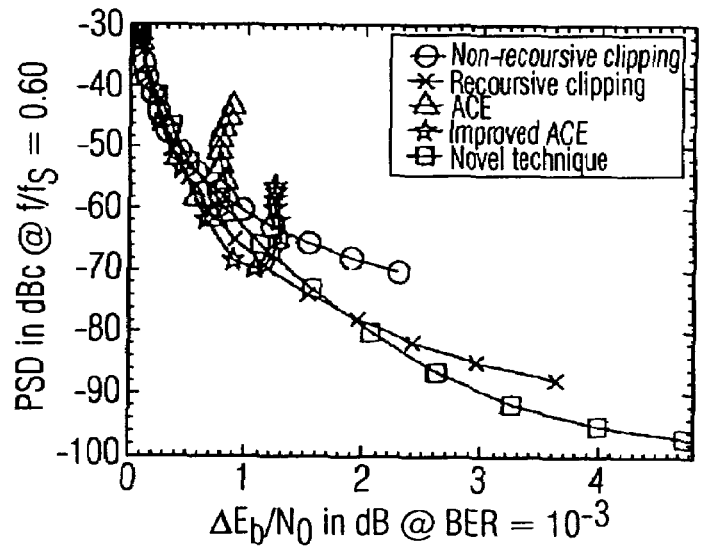
FIGS. 9a to 9h show performance comparison results.

FIG. 9a shows a performance comparison for QPSK transmission and a target BER of $10^{-3}$. The y-axis shows the PSD at the normalised frequency $f/f_s=0.6$, and the x-axis shows the loss $\Delta E_b/N_0$ against an undistorted transmission under the condition of the target BER=$10^{-3}$. The top left corner of the plot where all curves meet corresponds to the highest clipping ratio of CR=12 dB. When following the curves to lower PSDs and higher losses in $C_c^l$, the clipping ratio decreases.

Summarizing, it can be seen that the conventional ACE technique achieves a lowest PSD of about −62 dB with a slightly better performance than recursive clipping at this point. The inventive improved ACE technique achieves a slightly better performance at PSD=−62 dB and can achieve up to PSD=−70 dB with a better performance than recursive clipping. Between PSD=−70 dB and PSD=−77 dB, the recursive clipping technique has the best performance. Especially, in the case of PSD less than −77 dB, the inventive clipping technique outperforms all other techniques at a loss of $\Delta E_b/N_0>1.8$ dB.

Figure 9B:
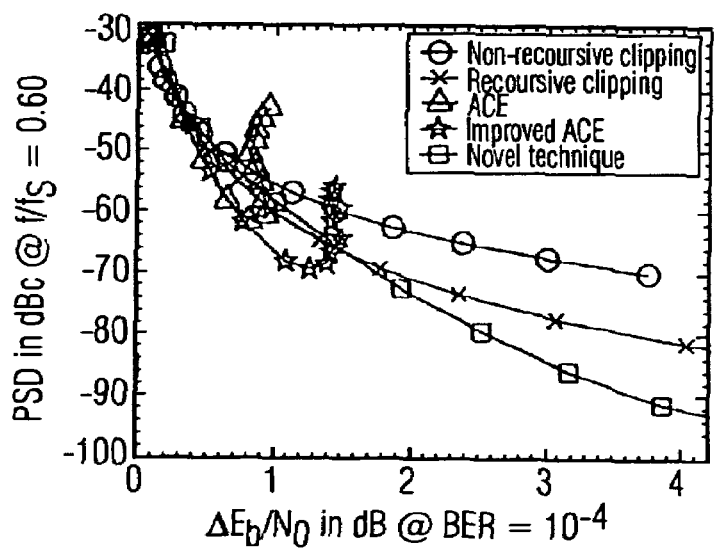

For a lower target BER=$10^{-4}$, as is shown in FIG. 9b, the inventive improved ACE technique and the inventive clipping technique perform better than all investigated conventional techniques. While the same OOB radiation can be achieved for a certain clipping ratio, the recursive and non-recursive clipping technique experience a stronger degradation in $E_b/N_0$ than the ACE techniques respectively the inventive clipping technique associated with a shaping of the error signal, where the clipping noise distribution is optimised for low PSD respectively for high PSD requirements.

Figure 9C:
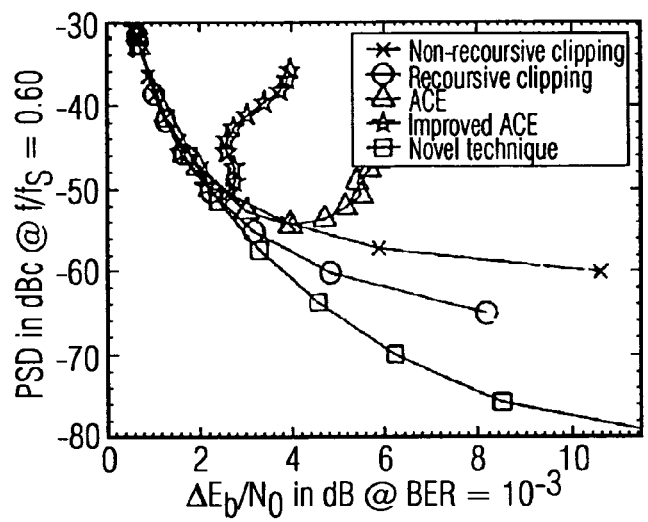
Figure 9D:
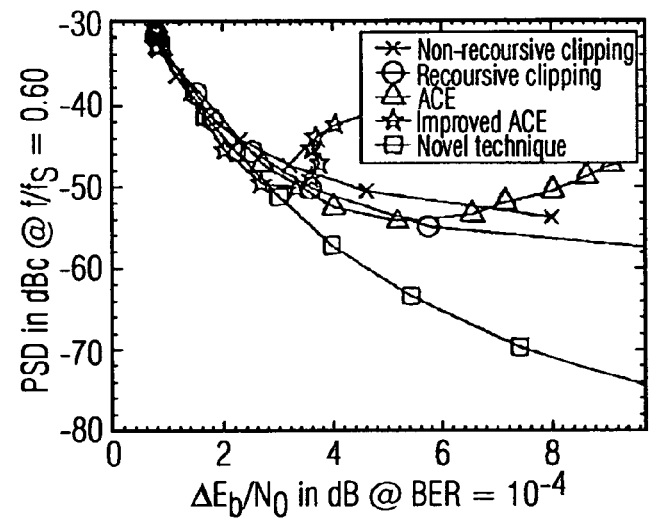

FIG. 9c shows a comparison for 16 QAM transmission and target BER=$0^{-3}$. The ACE techniques cannot achieve superior performance because only some sub-carriers can be used for peak reduction. Furthermore, the small minimum distance between the symbols makes a right-angle distribution of the clipping noise less favourable. The inventive clipping technique on the other hand considers this fact and achieves e.g. an approximately 0.5 dB better $E_b/N_0$ for PSD=−85 dB than the second best technique for this scenario, which is recursive clipping.

Figure 9E:
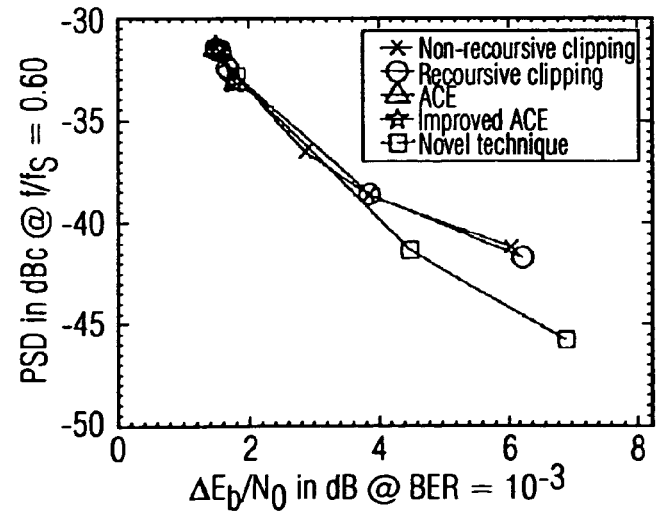

For a target BER=$10^{-4}$, the performance improvement of the inventive clipping technique is even higher, which is demonstrated in FIG. 9e. From the investigated clipping techniques it is the only one that can achieve PSD=−65 dB or less even under these difficult circumstances. However, all of the investigated techniques suffer from a significant loss in $E_b/N_0$ of a few decibel. Furthermore, the inventive improved ACE technique has a $E_b/N_0$ advantage of up to 0.5 dB over the conventional techniques for PSD<−50 dB.

FIG. 9e shows a performance of 64 QAM transmission scheme. It can be seen that already for a target BER=$10^{-3}$ there is a strong degradation in $E_b/N_0$ for all investigated techniques. Although the inventive clipping technique has better performance than all other investigated techniques, only a small reduction of the PDS can be achieved. For example, for PSD=−45 dB there is still a loss of more than $\Delta E_b/N_0$=6 dB in comparison to undistorted transmission even for the inventive clipping technique.

Figure 9F:
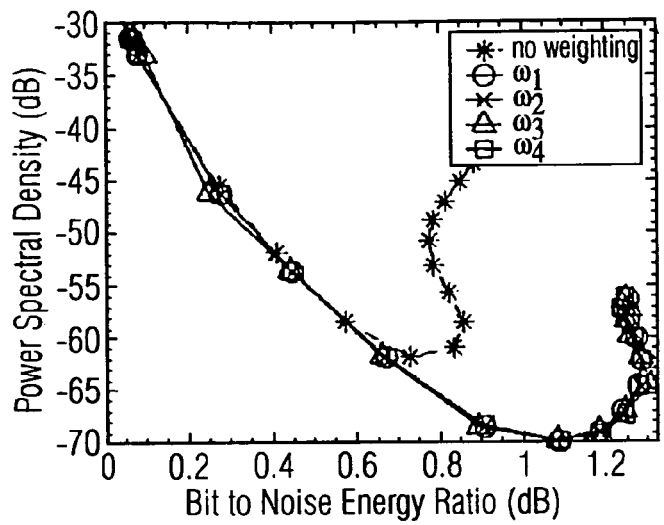
Figure 9G:
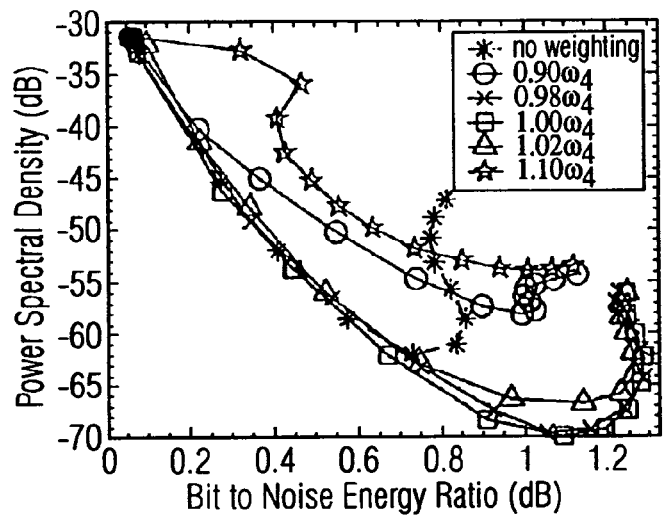
Figure 9H:
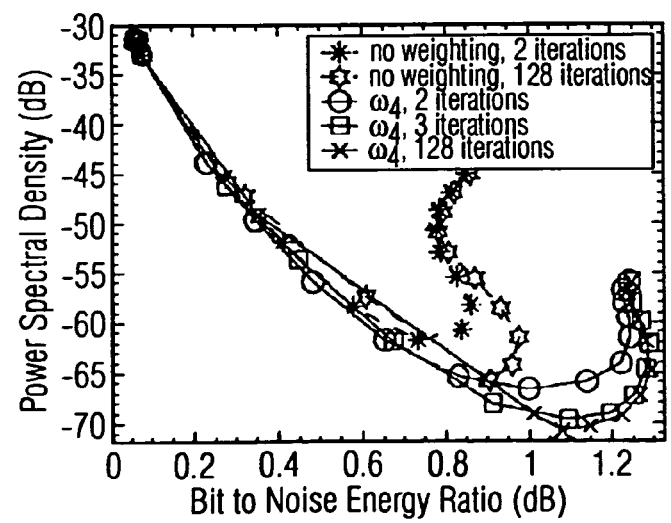

FIG. 9f shows a performance comparison for different weighting factors, FIG. 9g shows a performance comparison for the case of weighting with constant weighting factors, and FIG. 9h shows a performance comparison in dependence on a number of iterations.

In accordance wit a further aspect, the error signal may further be processed to obtain the transmit signal.

Figure 10:
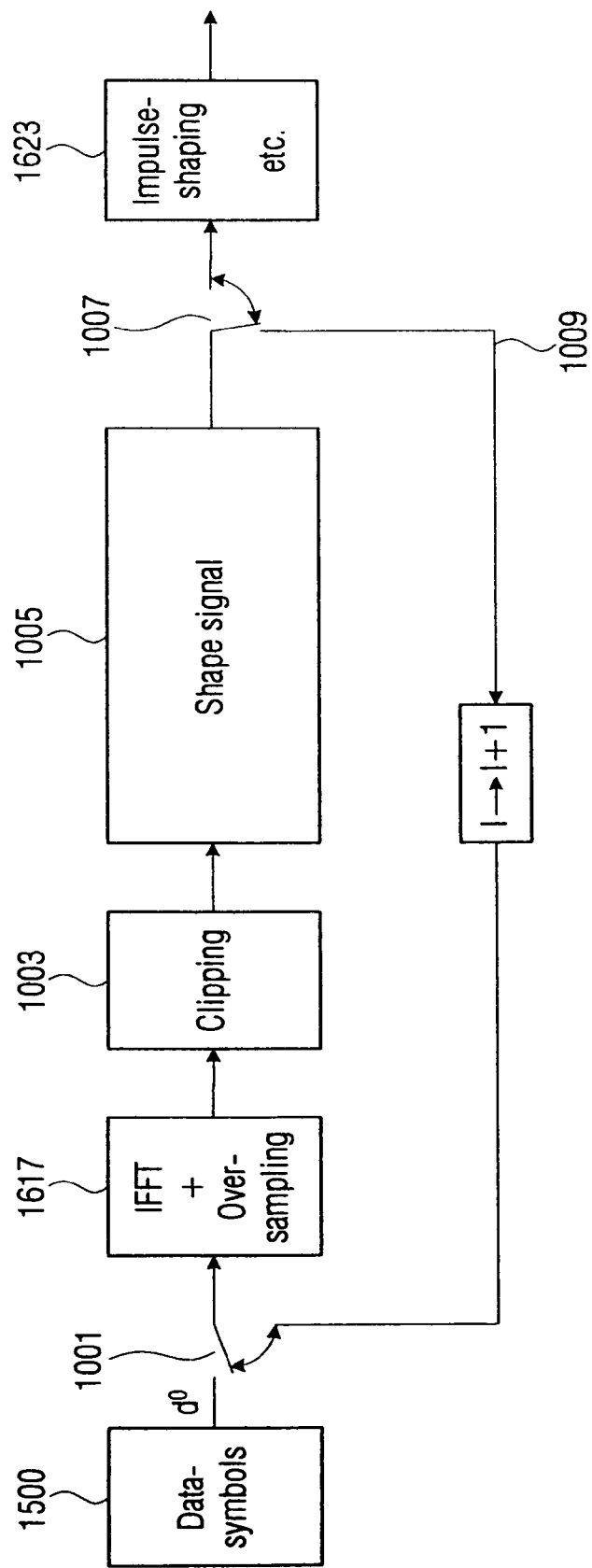
FIG. 10 show a block diagram of an apparatus for generating a transmit signal in accordance with a further embodiment of the present invention.

FIG. 10 shows a block diagram of an apparatus for generating the transmit signal in accordance with a further embodiment of the present invention.

The data symbol source 1500 is coupled via an optional switch 1001 to the IFFT 1617 performing an inverse Fourier transform and oversampling. The output of the IFFT 1617 is coupled to a means 1003 for distorting. The means 1003 for distorting is operative for distorting a time-domain signal provided by the IFFT 1617 by performing e.g. a clipping operation. The means 1003 for distorting is coupled to a means 1005 for manipulating, wherein an output of means 1005 for manipulating is coupled via an optional switch 1007 to the optional impulse shaping block 1623. Furthermore, the apparatus comprises a feedback loop 1009 extending from the switch 1007 to the switch 1001, so that an optional iteration l=l+1 may be performed.

As is depicted in FIG. 10, the means 1005 for manipulating is configured for manipulating a distorted signal provided by the means 1003 for distorting in time domain. The means 1005 for manipulating may be configured for shaping the distorted signal such that, in frequency domain, e.g. the inventive distributions shown in FIGS. 8a to 8e, for example the circular distribution, result. This operation is performed in the time domain. The transmit signal provided by the means 1005 for manipulating in the time domain may be shaped by the impulse shaping block 1623.

Figure 11:
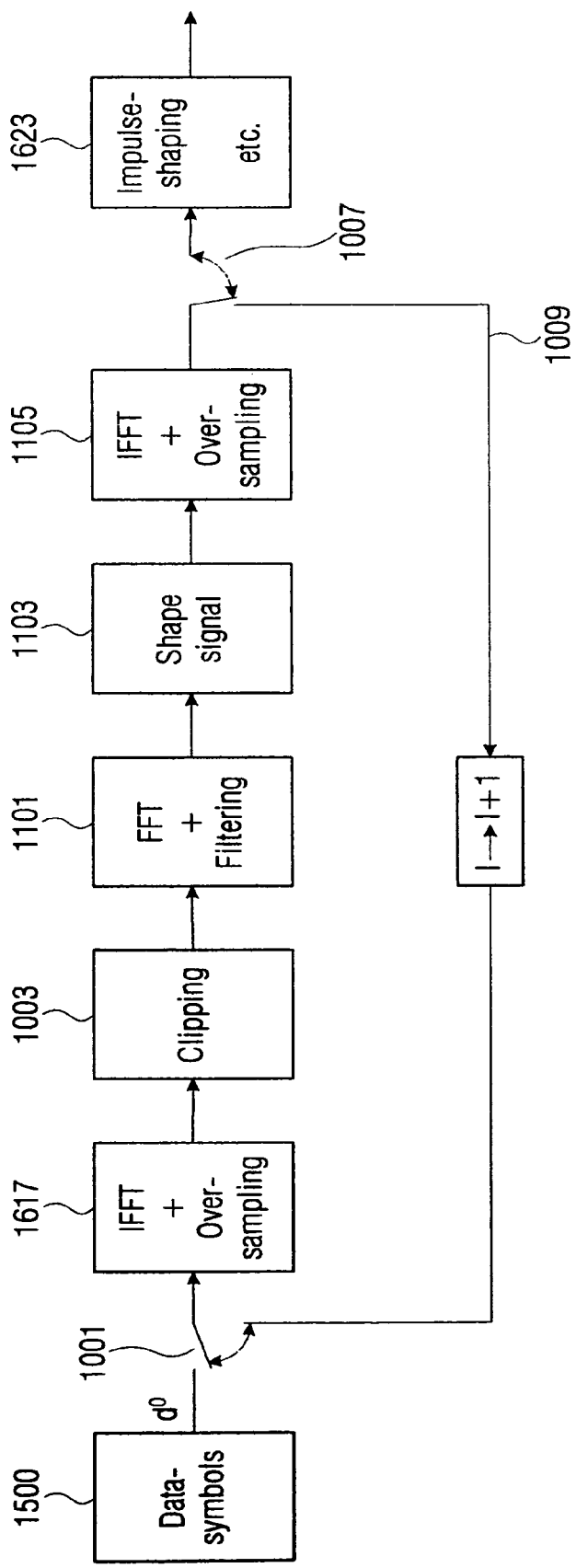
FIG. 11 show a block diagram of an apparatus for generating a transmit signal in accordance with a further embodiment of the present invention.
Figure 12:
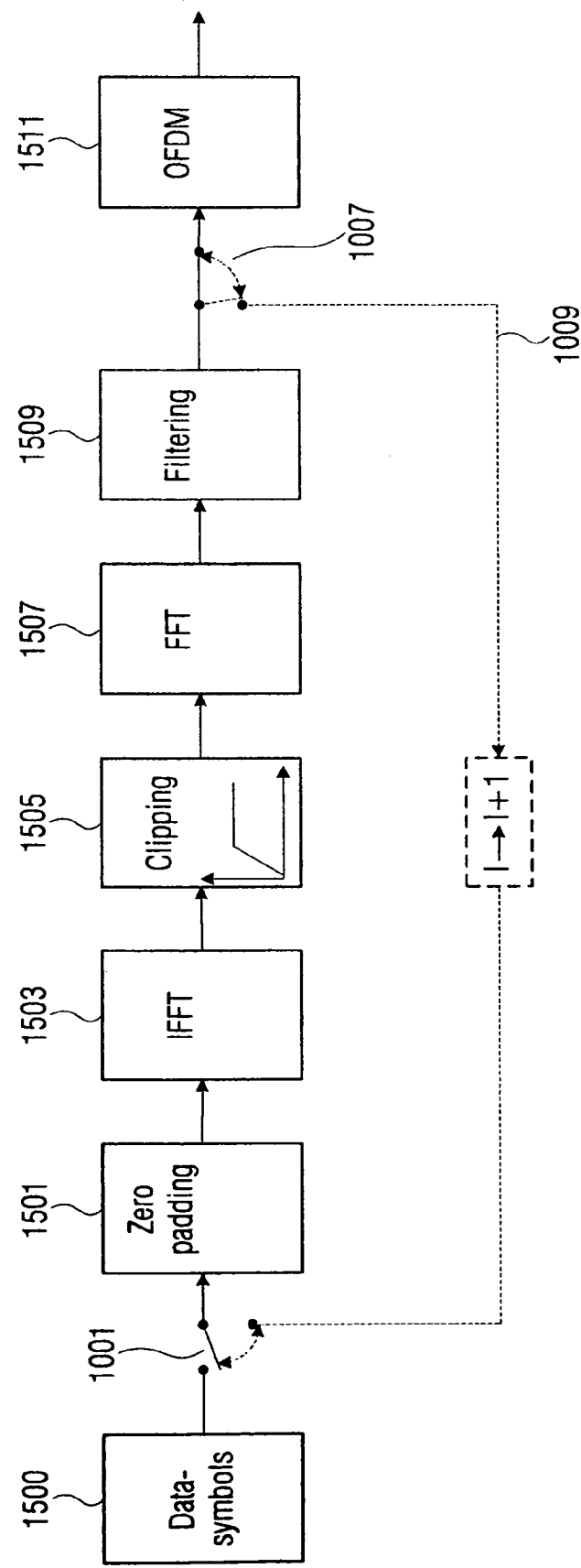
FIG. 12 shows a block diagram of a conventional PAPR approach.

FIG. 11 shows a block diagram of an apparatus for generating the transmit signal in accordance with a further embodiment of the present invention.

Unlike the apparatus of FIG. 10, the means 1003 for distorting is coupled to a FFT 1101 being configured for performing e.g. a fast Fourier transform and filtering. The FFT 1101 is coupled to a means 1103 for manipulating being operative for manipulating a distorted signal provided by the FFT 1101 in a frequency domain, e.g. shaping. The means 1103 for manipulating is coupled to an IFFT 1105 being configured for performing e.g an inverse fast Fourier transform and oversampling. The transmit signal provided by the IFFT 1105 may further be impulse shaped.

The apparatus shown in FIG. 11 achieves the inventive constellations, e.g. shown in FIGS. 8a to 8e in frequency domain.

As is depicted in FIGS. 10 and 11, the transmit signal may be generated without explicitly generating the error signal from a difference between the input signal and the distorted signal, since the error signal directly derived from the input signal may be used for generating the transmit signal. In a simplest case, the signal processing chain may contain the data source, IFFT and oversampling, distortion (e.g. clipping) in order to obtain the desired distribution, wherein also other distributions then those shown in FIGS. 8a to 8e may be achieved.

The present invention introduces a weighting factor for the clipped signal (generally: distorted signal portion) in order to improve the performance of the active constellation extension technique, as has been demonstrated above. In particular, four specific ways are provided on how to choose the weighting factor. Moreover, shaping of the clipping noise per sub-carrier can be performed in order to minimise the total error rate of a multicarrier signal. The shaping of the clipping noise per sub-carrier may be performed with respect to a specific shape (specific predetermined area) that is different for each sub-carrier. Moreover, the shape mentioned above can be adapted to the modulation alphabet on the specific sub-carrier, to the channel state information (CSI) or to the quality of service (QOS), i.e. to the target error rate, to combinations of these three possibilities or to other requirements.

Moreover, the present invention provides a concept for shaping the clipping noise, i.e. the clipped signal portion (distorted portion) by limiting the noise power, i.e. the clipping signal portion's power per sub-carrier, which may result in the previously mentioned circular constellation. Moreover, the noise power per sub-carrier can be limited by clipping the noise in frequency domain. The inventive clipping technique may include the weighting factor described above, shaping of the clipping noise, weighting of the clipping noise, e.g. by the smart gradient project algorithm or repeated peak reduction by recursive signal processing.

The inventive concepts contribute to a lower out-of-band radiation, a better transmission quality, a lowered requirement for design of radio frequency parts that results in reduced costs, reduced space, and a lower power consumption. In comparison to other clipping techniques the inventive improvements especially pay out in case of a restrictive spectrum mask, high requirements for the BER and a high data rate corresponding to a high number of sub-carriers and a high number of signal mapping points, e.g. 16 QAM. The inventive concepts may be used in other fields of wireless radio, broad band access systems, multicarrier systems, transmitter design, non-linearities, peak power reduction, clipping techniques, etc.

In accordance with the present invention, oversampling and filtering is performed. Preferably, oversampling is used in order to find the peaks, since some peaks being present in an analogue signal would disappear for the time discrete signal without oversampling. By oversampling, the analogue signal is approximated and more peaks can be found. The filter is a consequence from oversampling. Without oversampling, e.g. the dynamic range reduction performed for example by the clipping block 1607 in FIG. 5 would create only inter carrier interference (ICI). With oversampling, the dynamic range reduction creates ICI and out-of-band radiation, which should be filtered.

Moreover, depending on certain implementation requirements of the inventive methods, the inventive methods can be implemented in hardware or in software. The implementation can be performed using a digital storage medium, in particular a disk or a CD having electronically readable control signals stored thereon, which can cooperate with a programmable computer system such that the inventive methods are performed. Generally, the present invention is, therefore, a computer program product with a program code stored on a machine-readable carrier, the program code being configured for performing the inventive methods, when the computer program product runs on a computer. In other words, the inventive methods are, therefore, a computer program having a program code for performing the inventive methods, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Apparatus for generating an error signal from an input signal, the input signal comprising a signal peak, the error signal to be combined with the input signal for generating a transmit signal having a reduced signal peak, the apparatus comprising:

means for a limiting the input signal to obtain a limited signal;

means for calculating a preliminary error signal representing a difference between the input signal and the limited signal or representing the input signal, wherein the preliminary error signal comprises a number of preliminary error signal values;

means for manipulating the preliminary error signal to obtain the error signal, wherein the means for manipulating is configured for varying a preliminary error signal value to obtain an error signal value which is non-equal to zero, and such that the error signal value is in a predetermined value range associated with a predetermined area in a signal space domain, wherein the means for manipulating is further configured, for the case the preliminary error signal value does not meet a property requirement, for back manipulating the preliminary error signal value to obtain an error signal value such that the error signal value is associated with a signal space constellation point being within a further predetermined area in the single space domain but outside the predetermined area, the further predetermined area being wider than the predetermined area.

2. Apparatus according to claim 1, wherein the input signal comprises an amplitude peak, and wherein the error signal is to be combined with the input signal to generate the transmit signal having a reduced amplitude peak, wherein the means manipulator for manipulating is configured for varying the preliminary error signal value such that the error signal value is in a predetermined value range in order to increase a number of error signal values in the predetermined value range contributing to amplitude peak reduction, and such that an out-of-band radiation is reduced.

3. Apparatus according to claim 1, wherein the input signal comprises an amplitude peak, and wherein the error signal is to be combined with the input signal to generate the transmit signal having a reduced amplitude peak, wherein the means for manipulating is configured for varying the preliminary error signal value such that the error signal value is in a predetermined value range, wherein the predetermined value range is chosen such that the error signal value within the predetermined value range contributes to an amplitude peak in the transmit signal and such that an error rate associated with an erroneous detection of a receivable version of the transmit signal due to combining the input signal with the error signal is reduced.

4. Apparatus according to claim 1, wherein the means manipulator for manipulating is configured for varying a magnitude or a phase of the preliminary error signal value such that the error signal value has a magnitude or a phase defining a signal space constellation point in the signal space domain, the signal space constellation point being arranged inside the predetermined area or on a boundary thereof.

5. Apparatus according to claim 4, wherein the predetermined area in the signal space domain is rectangular or circular or right-angled or is a segment of a circle.

6. Apparatus according to claim 4, wherein the predetermined area is circular with respect to an origin of the signal space domain, and wherein the means for manipulating comprises a magnitude limiter for limiting the magnitude of the preliminary error signal value to obtain the error signal value having a magnitude which does not exceed a radius of the predetermined area.

7. Apparatus according to claim 4, further comprising means for determining the predetermined area in the signal space domain.

8. Apparatus according to claim 7, wherein the input signal comprises an amplitude peak, wherein the error signal is to be combined with the input signal to generate the transmit signal having a reduced amplitude peak, and wherein the means for determining the predetermined area is configured for determining the predetermined area such that the error signal value associated with the signal space constellation point being with the predetermined area or on a boundary thereof contributes to an amplitude peak reduction and such that an error rate associated with an erroneous detection of a receivable version of the transmit signal due to combining the input signal with the error signal is minimized.

9. Apparatus according to claim 8, wherein the input signal is a multi-carrier signal, wherein a spectral representation of the input signal comprises a set of spectral values being assigned to a set of sub-carriers, wherein a spectral value in the set of spectral values results from assigning a number of information values to a certain signal space constellation point according to a modulation scheme, wherein the means for determining the predetermined area is configured for determining the predetermined area in dependence on a error probability associated with the modulation scheme.

10. Apparatus according to claim 9, wherein a further spectral value in the set of spectral values results from assigning a further number of information values to a further certain signal space constellation point according to a further modulation scheme, wherein the means for determining the predetermined area is configured for determining a further predetermined area in dependence on a further bit error probability associated with the further modulation scheme.

11. Apparatus according to claim 10, wherein the modulation scheme or the further modulation scheme belongs to a quadrature amplitude modulation (QAM) or to a phase shift keying (PSK) or to a quaternary phase shift keying (QPSK) or to an amplitude shift keying (ASK).

12. Apparatus according to claim 10, wherein a preliminary error signal value is assigned to a sub-carrier to which the spectral value is assigned, and wherein a further preliminary error signal value is assigned to a further sub-carrier, to which the further spectral value is assigned, wherein the means for manipulating is configured for manipulating a magnitude and a phase of the preliminary error signal value to obtain an error signal value being associated with a signal space constellation point being within the predetermined area or on a boundary thereof, or wherein the means for manipulating is operative for manipulating a magnitude or a phase of the further preliminary error signal value to obtain a further error signal value being associated with a further signal space constellation point being within the further predetermined area or on a boundary thereof.

13. Apparatus according to claim 9, wherein the modulation scheme comprises a set of signal space constellation points, to which information values are assignable, wherein a first subset of signal space constellation points in the set of signal space constellation points is associated with a first magnitude, and wherein a second subset of signal space constellation points is associated with a second magnitude being greater than the first magnitude, wherein a preliminary error signal value is associated with a sub-carrier, to which the spectral value is assigned, wherein the means manipulator for manipulating is configured for manipulating a preliminary error signal value associated with a signal space constellation point belonging to the first subset of signal space constellation points differently than an error signal value associated with a signal space constellation point belonging to the second subset of signal space constellation points.

14. Apparatus according to claim 1, wherein the preliminary error signal value comprises a real part and an imaginary part, wherein the means for manipulating is figured for separately varying the real part and the imaginary part.

15. Apparatus according to claim 1, wherein the means for manipulating comprises a magnitude limiter for limiting a magnitude of the preliminary error signal value.

16. Apparatus according to claim 15, wherein the input signal is a multi-carrier signal resulting from frequency-time transform of spectral values assigned to sub-carriers, wherein a spectral value associated with a certain sub-carrier results from assigning a number of information values to a certain signal space constellation point in accordance with a modulation scheme, wherein the preliminary error signal value is associated with the certain sub-carrier, and wherein the magnitude limiter is configured for limiting the magnitude of the preliminary error signal value in dependence on the modulation scheme.

17. Apparatus according to claim 16, wherein another spectral value associated with another sub-carrier results from assigning another number of information values to another signal space constellation point in accordance with another modulation scheme, wherein another preliminary error signal value is associated with the another sub-carrier, wherein the magnitude limiter is configured for individually limiting the magnitude of the preliminary error signal value in dependence on the modulation scheme and for limiting a magnitude of the another preliminary error signal value in dependence on the another modulation scheme.

18. Apparatus according to claim 15, wherein the magnitude limiter is configured for clipping the magnitude of the preliminary error signal value.

19. Apparatus according to claim 1, further comprising means for determining the predetermined value range in dependence on a channel state information.

20. Apparatus according to claim 19, wherein the means for determining the predetermined value range is configured for adaptively determining the predetermined value range in dependence on a varying channel state.

21. Apparatus according to claim 1, wherein the means for manipulating is configured for varying the preliminary error signal value in accordance with a predetermined constraint.

22. Apparatus according to claim 21, wherein the predetermined constraint is a predetermined value range or a predetermined bit error rate or a current channel state condition or a quality of service requirement or an available transmit power.

23. Apparatus according to claim 1, wherein the means for limiting comprises an amplitude limiting element for limiting an amplitude of the input signal to obtain a preliminary limited signal, and a weighting element for weighting the preliminary limited signal with a weighting coefficient in order to increase an energy of the preliminary limited signal to obtain the limited signal having an increased energy.

24. Apparatus according to claim 1, wherein the means for calculating the preliminary error signal comprises a subtracter for calculating a difference between the input signal and the limited signal.

25. Apparatus according to claim 24, wherein the means for calculating comprises a time-frequency transformer for time-frequency transforming the difference to obtain the preliminary error signal in frequency domain.

26. Apparatus according to claim 1, wherein the means for calculating comprises a time-frequency transformer for time-frequency transforming the limited signal to obtain a transformed limited signal, and a second time-frequency transformer for time-frequency transforming the input signal to obtain a transformed input signal, and a subtracter for calculating a difference between the transformed input signal and the transformed limited signal to obtain the preliminary error signal in frequency domain.

27. Apparatus according to claim 1, wherein the means for calculating the preliminary error signal comprises a filter.

28. Apparatus according to claim 1, wherein the means for manipulating is configured for providing the preliminary error signal value as an error signal value for the case that the preliminary error signal value meets the property requirement.

29. Apparatus according to claim 1, further comprising an analyzer for analyzing the preliminary error signal value with respect to the property requirement.

30. Apparatus according to claim 29, the apparatus being further configured for generating the error signal iteratively, wherein the analyzer is configured for analyzing an error signal value generated in a previous iteration step with respect to the property requirement, and, to some extent, for back-manipulating the error signal value to obtain an error signal value meeting the property requirement, the error signal value being associated with a signal space constellation point being within the further predetermined area.

31. Apparatus according to one of claims 1 to 30, wherein the property requirement is a channel state information, a signal quality measure, a combination of different signal quality measures, a certain bit error ratio or a certain power spectral density associated with transmitting the transmit signal, or a certain bit to noise energy ratio or a certain signal to noise energy ratio associated with a power spectral density, or a certain power spectral density associated with a bit to noise energy ratio or signal to noise energy ratio, the property requirement further depending on a transmission parameter associated with transmitting the transmit signal.

32. Apparatus for generating a transmit signal from an input signal, wherein
the input signal comprises a signal peak, the apparatus comprising:
the apparatus for generating an error signal from the input signal in accordance with any of claims 1 to 30;
a processor for processing the error signal to obtain a processed error signal; and
a combiner for combining the processed error signal with the input signal to obtain the transmit signal having a reduced amplitude peak.

33. A method for generating an error signal from an input signal, the input signal comprising a signal peak, the error signal to be combined with the input signal for generating a transmit signal having a reduced signal peak, the method comprising the following steps:
limiting the input signal to obtain a limited signal;
calculating a preliminary error signal representing a difference between the input signal and the limited signal or representing the input signal;
varying a preliminary error signal value to obtain an error signal value which is non-equal to zero, and such that the error signal value is in a predetermined value range associated with a predetermined area in a signal space domain,
wherein the step of varying is performed such that, for the case that the preliminary error signal value does not meet a property requirement, the preliminary error signal value is back manipulated to obtain an error signal value such that the error signal value is associated with the signal space constellation point being within a further predetermined area in the signal space domain hut outside the predetermined area, the further predetermined area being wider the predetermined area.

34. A method for generating a transmit signal from an input signal, wherein the input signal comprises a signal peak, the method comprising the following steps:

generating an error signal from the input signal in accordance with claim 33;

processing the error signal to obtain a processed error signal; and combining the processed error signal with the input signal to obtain the transmit signal having a reduced amplitude peak.

35. A computer readable digital storage medium having stored thereon a computer program product having a program code for performing the method according to claim 33, when the program runs on a computer.

* * * * *